Figure 5:
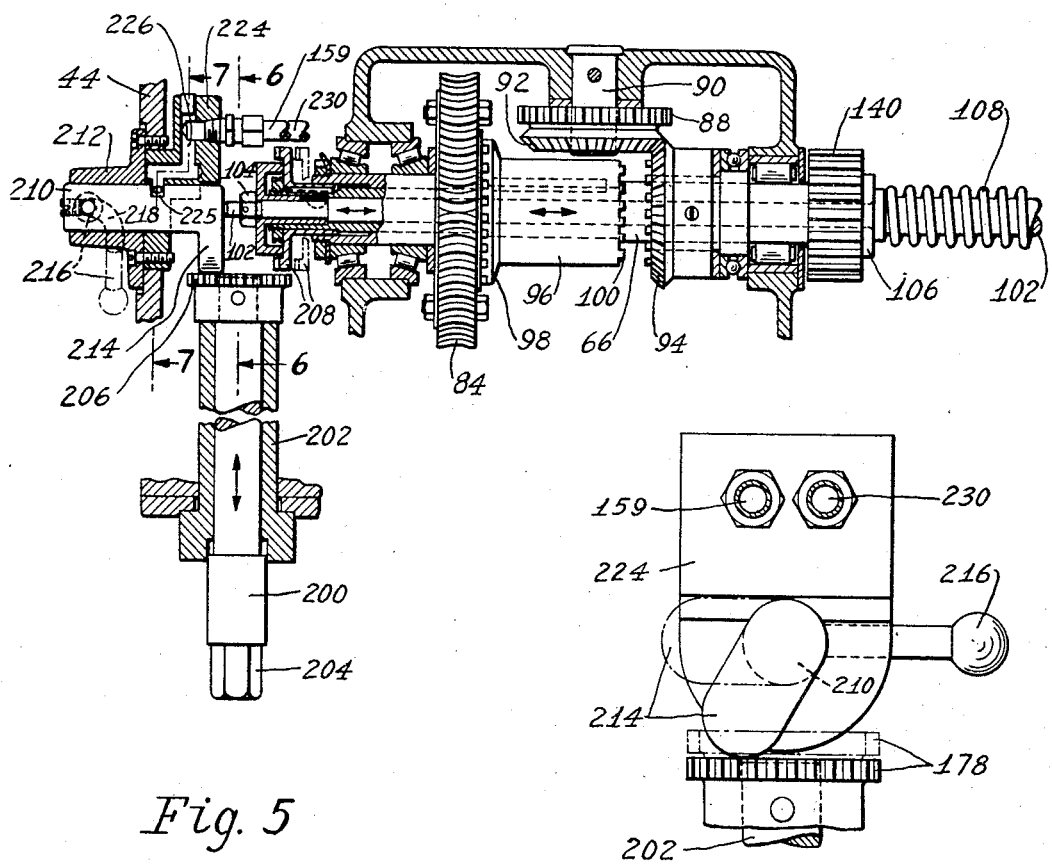

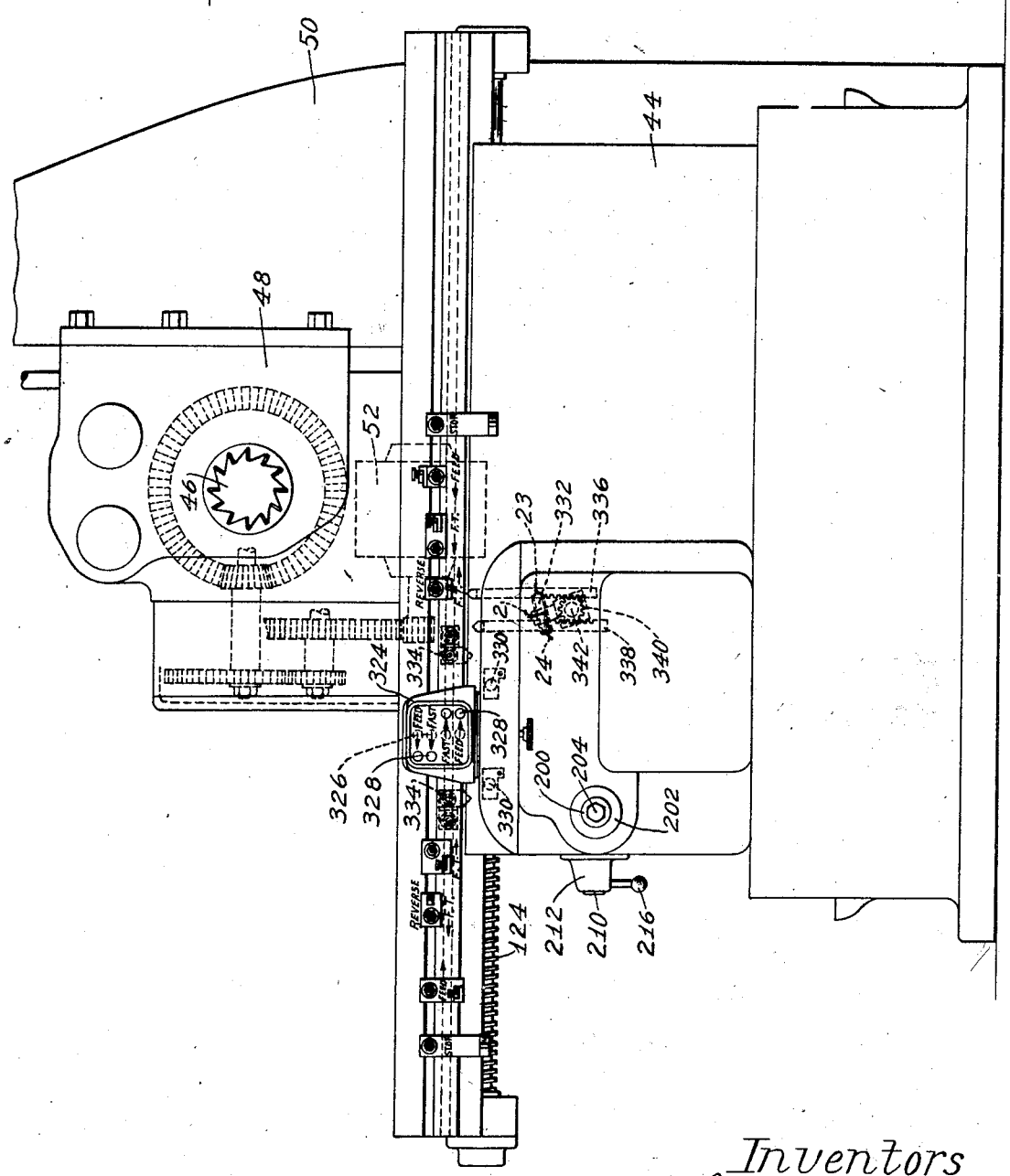

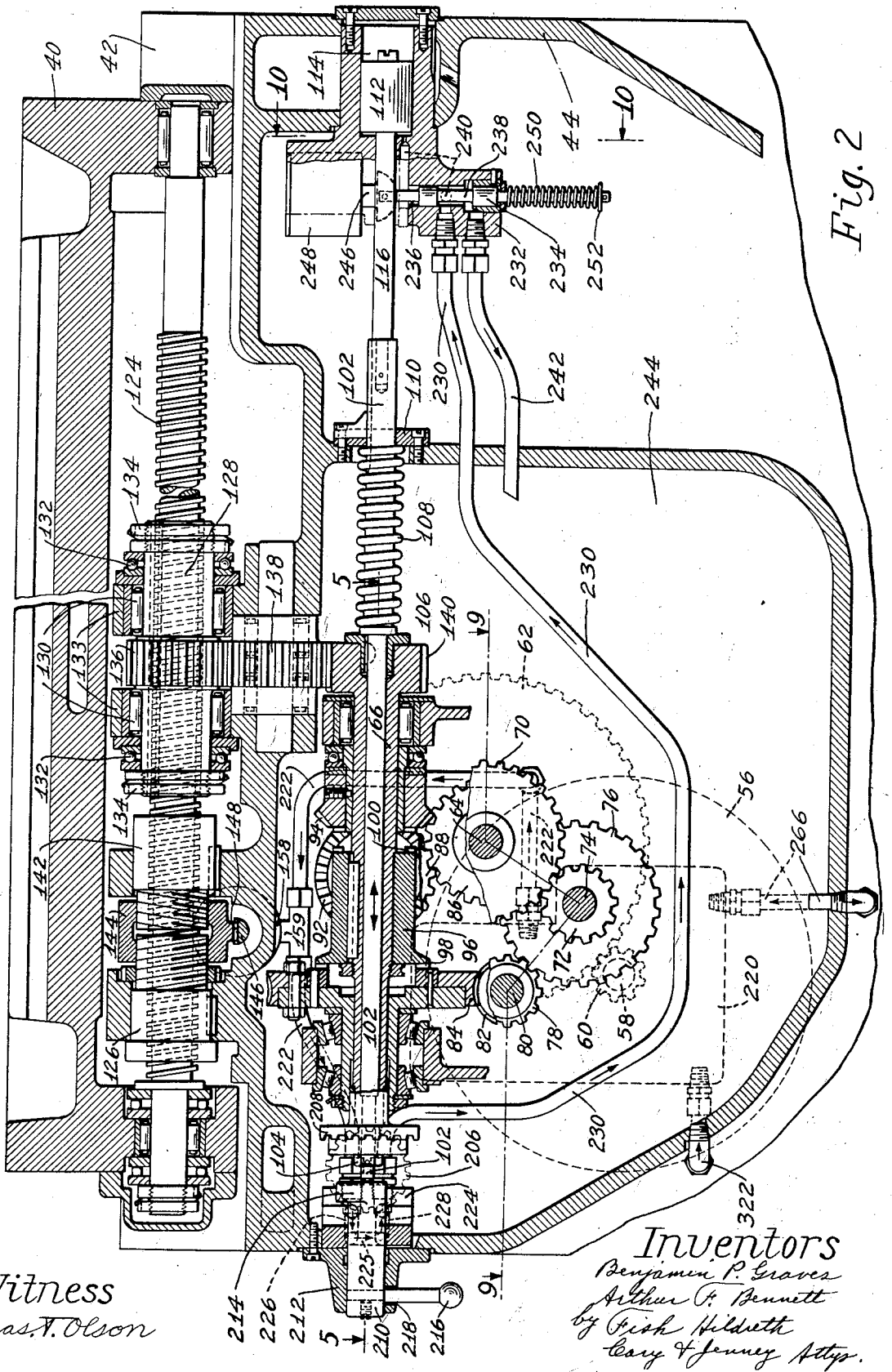

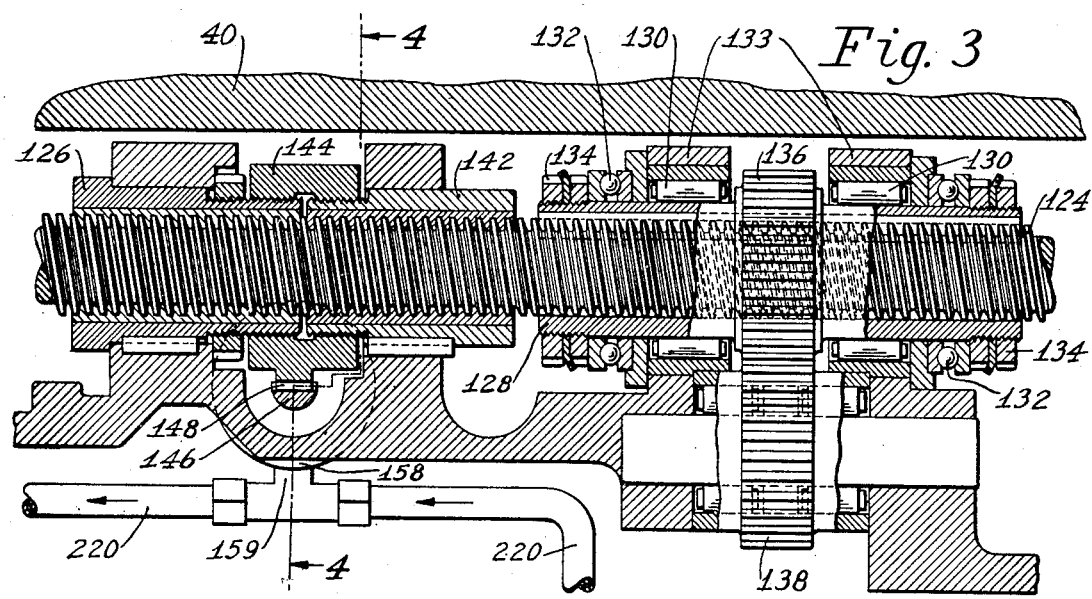
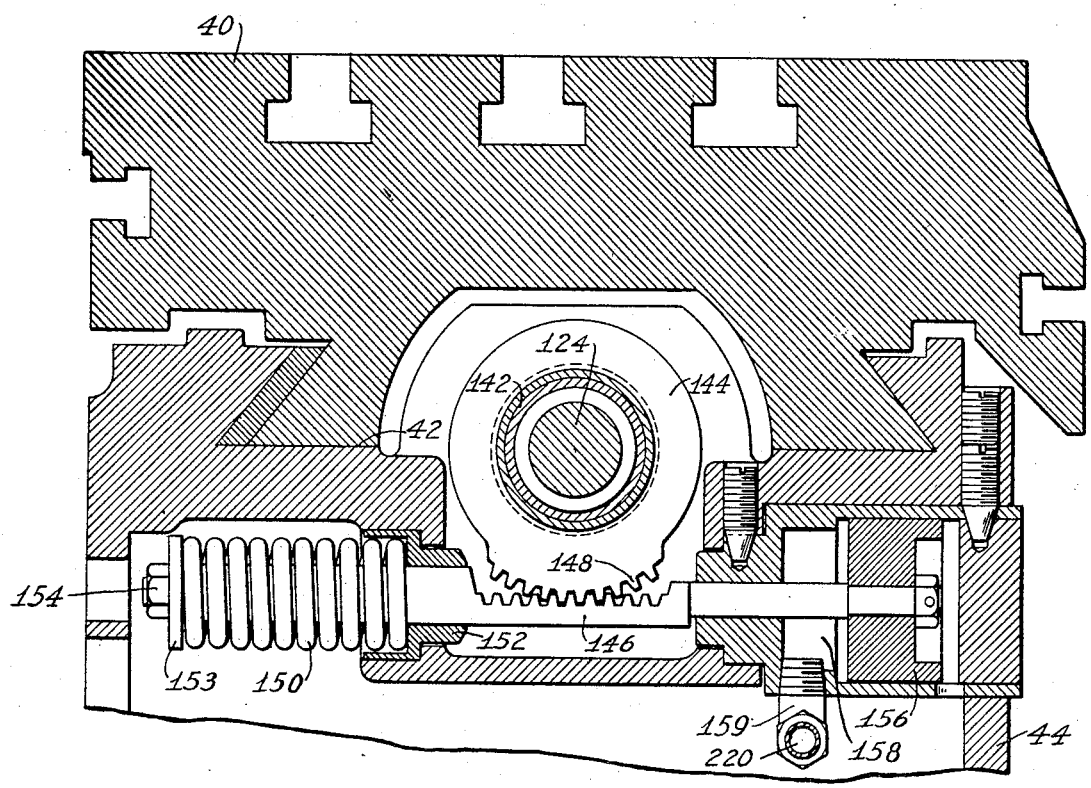

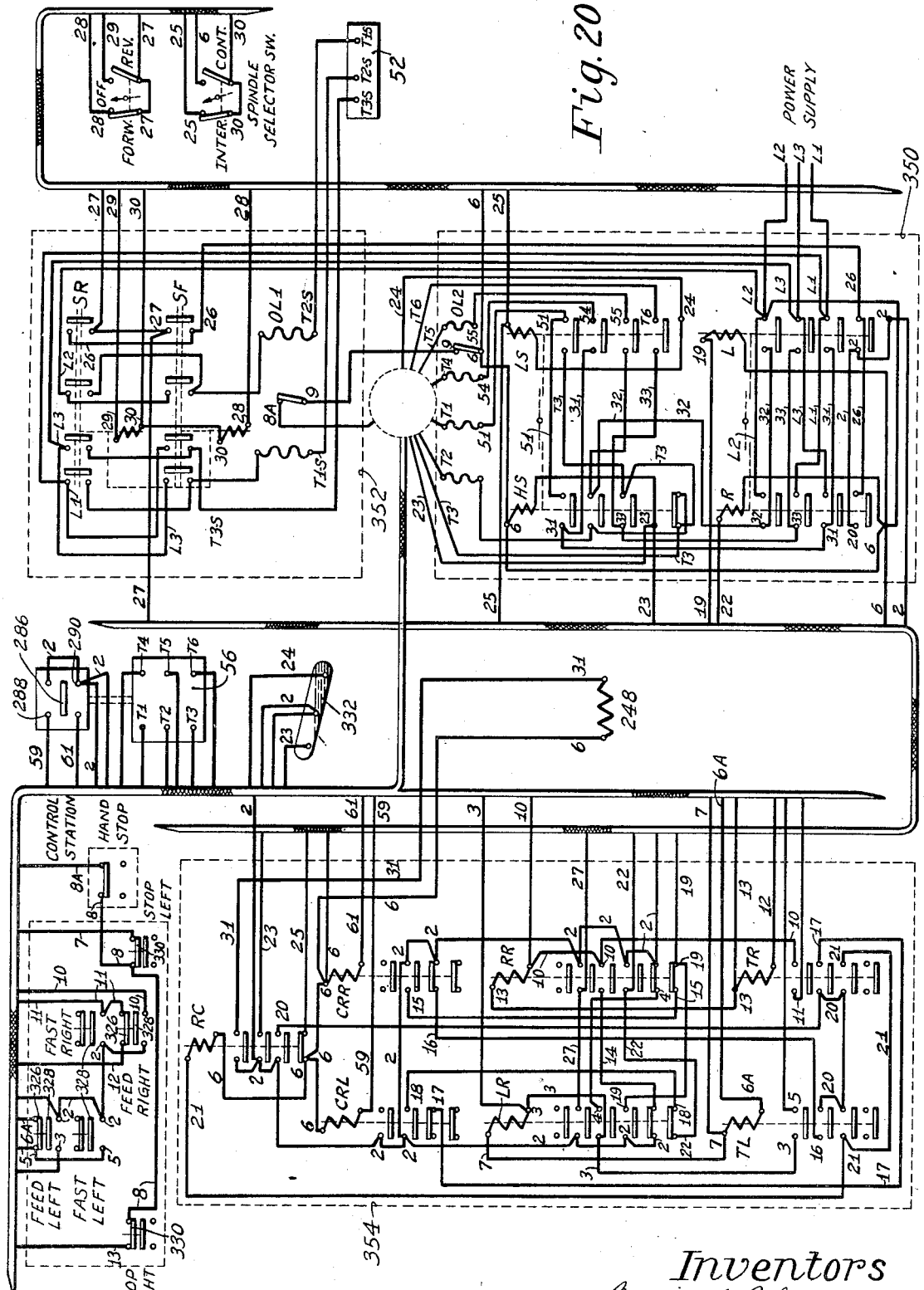

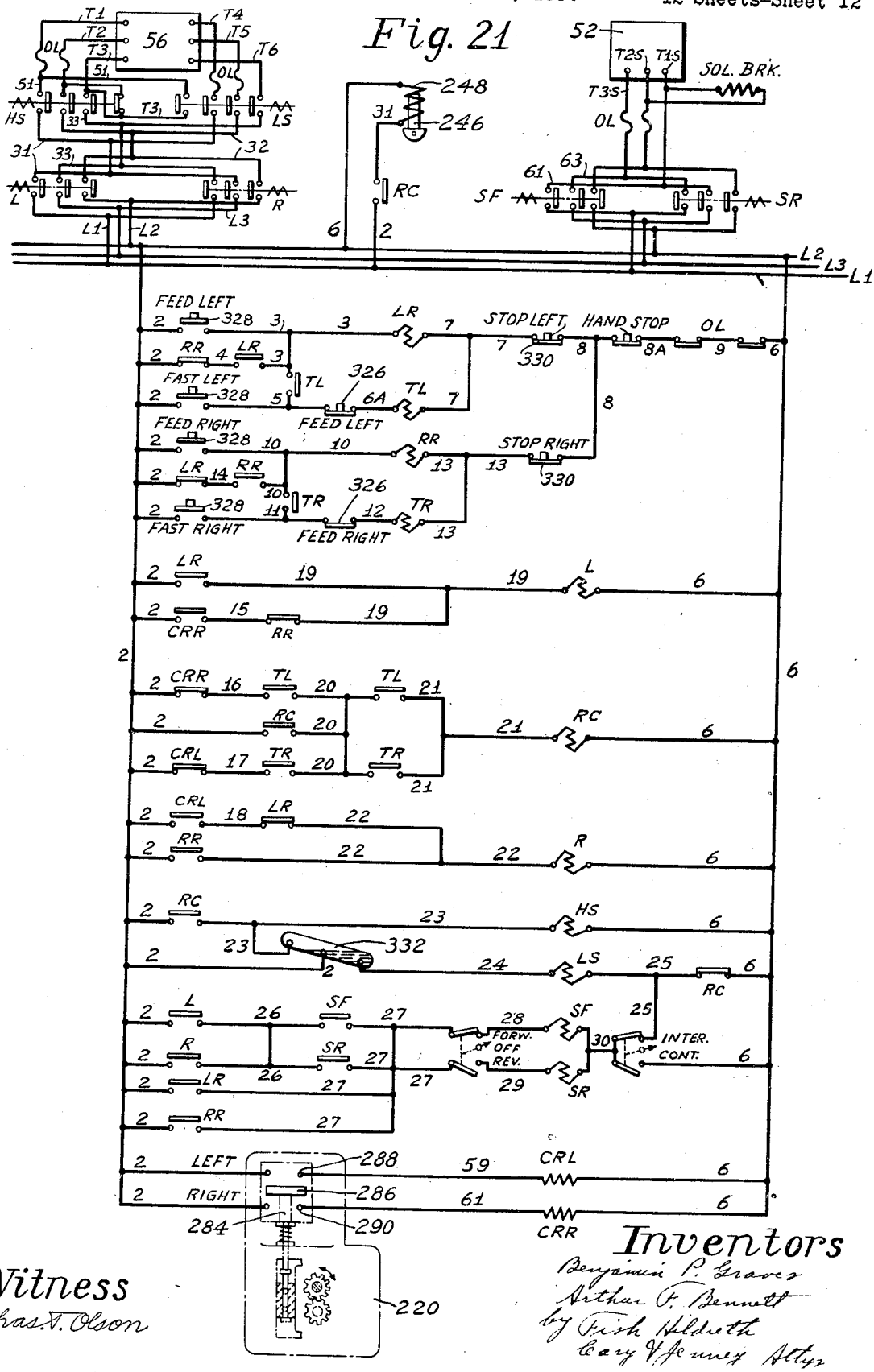

Patented July 26, 1938

2,124,852

UNITED STATES PATENT OFFICE 2,124,852

MACHINE TOOL

Benjamin P. Graves, Cranston, and Arthur F. Bennett, West Barrington, R. I., assignors to Associated Patents, Inc., a corporation of Ohio Application March 9, 1934, Serial No. 714,808

34 Claims. (Cl. 90—21)

The present invention relates to improvements in machine tools, and more specifically to a class of machines which include a movable support mounted on ways to impart relative feeding and return movements to the work and operating tools.

The invention is herein disclosed as embodied in a milling machine which comprises a rotary milling cutter and a movable work support driven from a reversible electric motor through connections which include cooperating feed screw and nut driving elements and slow feed and quick traverse clutch connections.

It is one object of the present invention to provide in a machine of this general description, a novel and improved take-up device having a yielding take-up action to maintain a tight working engagement between the feed screw and nut elements which is particularly well adapted to insure the accurate positioning of the table at all times under varying strains during its travel in either direction without at the same time causing excessive frictional wear or binding of the parts.

It is another object of the invention to provide a novel and improved fluid pressure control system for the machine for controlling the operation of the several cooperating devices including particularly the slow feed and quick traverse clutch and the take-up device to ease off the take-up strain between the feed screw and nut elements during a manual or quick traverse operation of the table.

It is another object of the present invention to provide novel and improved means controlled by the direction of operation of the driving connections for the table and rendered operative upon reversal of the direcson of drive with the simultaneous shift of the clutch to quick traverse position to delay the operation of the clutch until after the reversal has actually taken place.

With these and other objects in view, as may hereinafter appear, one feature of the present invention consists in the provision in the table drive of a novel and improved take-up device for maintaining a tight operating engagement between the feed screw and nut elements to insure an accurate and even movement of the table regardless of the force exerted on the table in either direction by the operation of the cutter. This device comprises a second nut screw threaded to the feed screw and supported in fixed angular relationship to the usual feed nut, and a take-up member yieldingly actuated and having a cam action of relatively large advantage for effecting a relative axial movement of the nuts to maintain a tight operating engagement between the feed screw and nut elements. With this construction and arrangement of the parts, a substantially irreversible cam action is provided so that the strain exerted on the table in either direction by the engagement of the rotating cutter with the work is taken up against a rigid assembly of the two nuts which is positively supported against endwise movement in either direction on the machine frame.

In accordance with certain features of the present invention, a fluid pressure control system is provided which comprises a fluid pressure operated piston for moving the slow feed and quick traverse clutch to quick traverse position, a second fluid pressure operated piston for moving the take-up member to ease off the take-up device, a main control valve for supplying fluid under pressure simultaneously to each of these pistons, and a manual feed control valve arranged during the manual operation of the table to supply fluid pressure to the piston for easing off the take-up device. The main valve may be controlled manually or automatically during the operation of the table by means of electrical connections including an electromagnet as hereinafter more fully to be described.

In accordance with another feature of the invention, a reversible fluid pressure pump is provided driven from the reversible motor which is arranged upon reversal of the table drive with a simultaneous shift of the clutch from slow feed to quick traverse position to delay the operation of the clutch until reversal has actually taken place.

Figure 6:
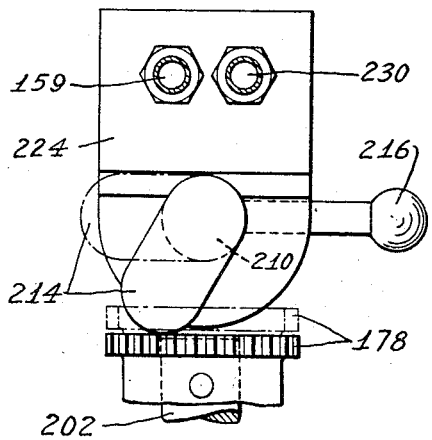
Figure 7:
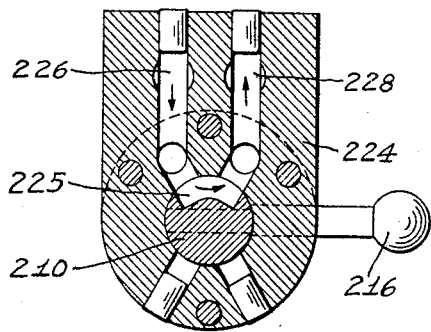
Figure 8:
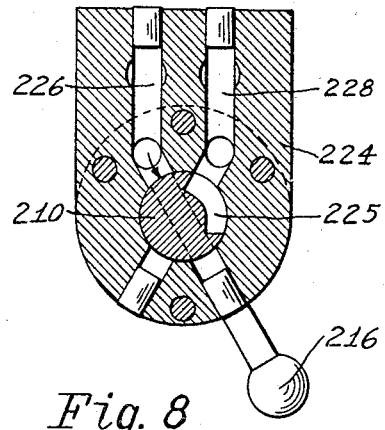
Figure 9:
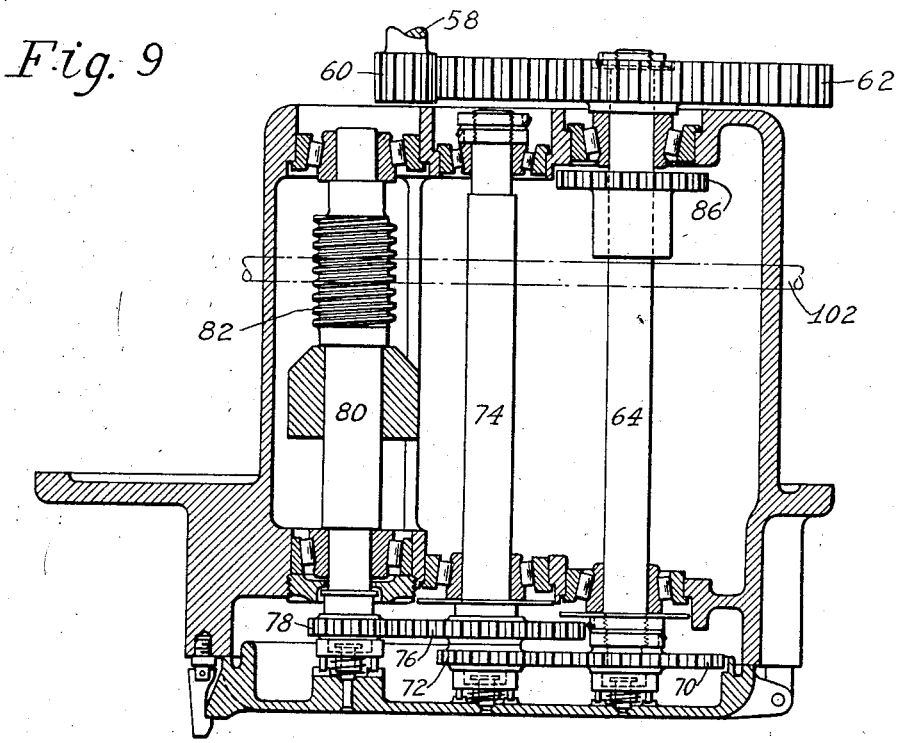
Figure 10:
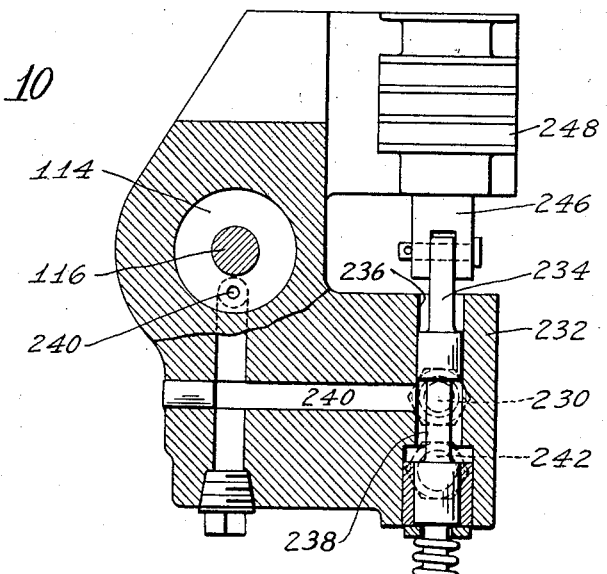
Figure 11:
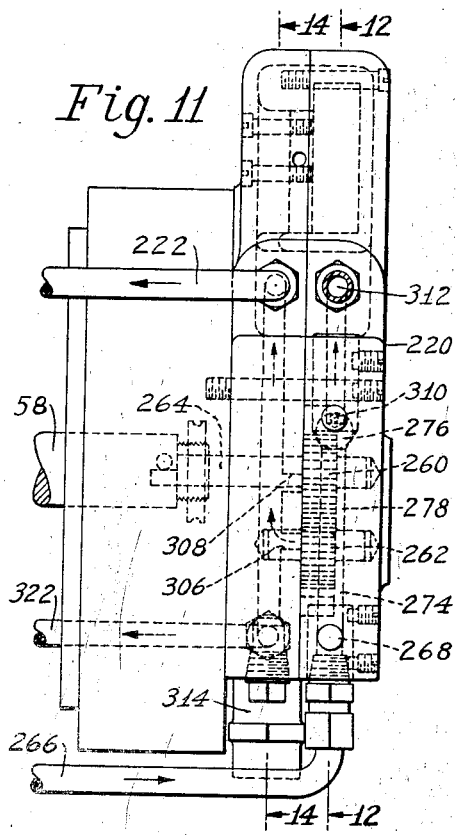
Figure 12:
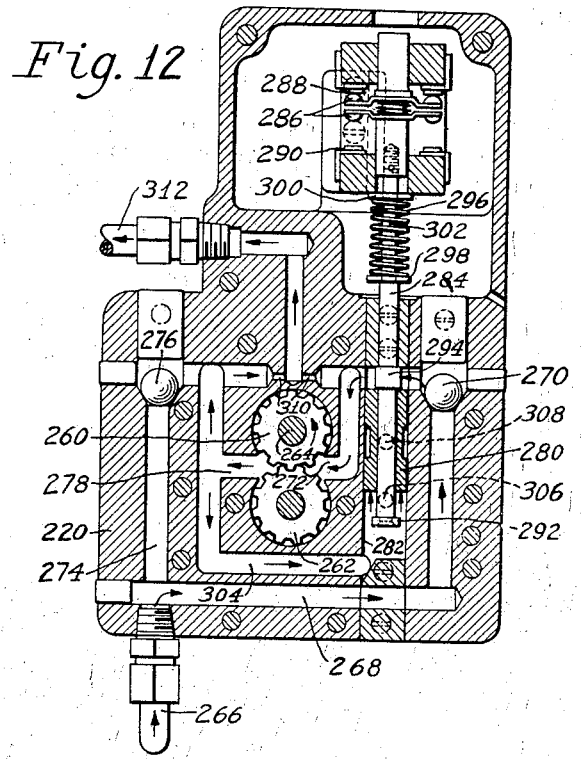
Figure 14:
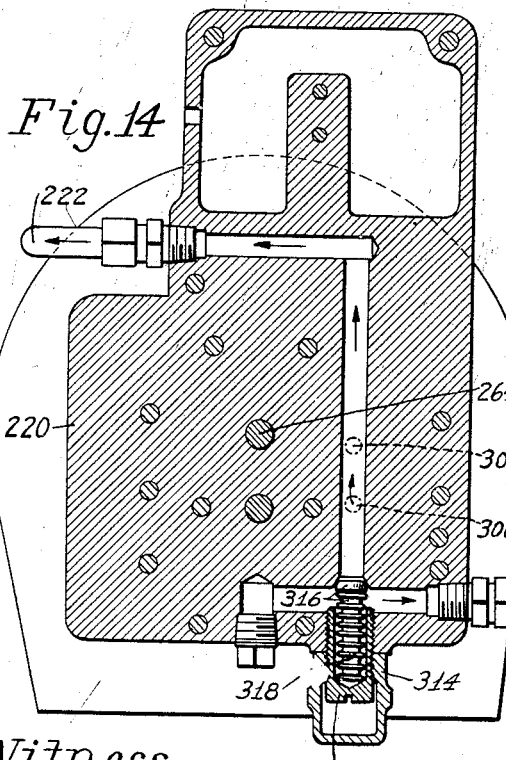
Figure 13:
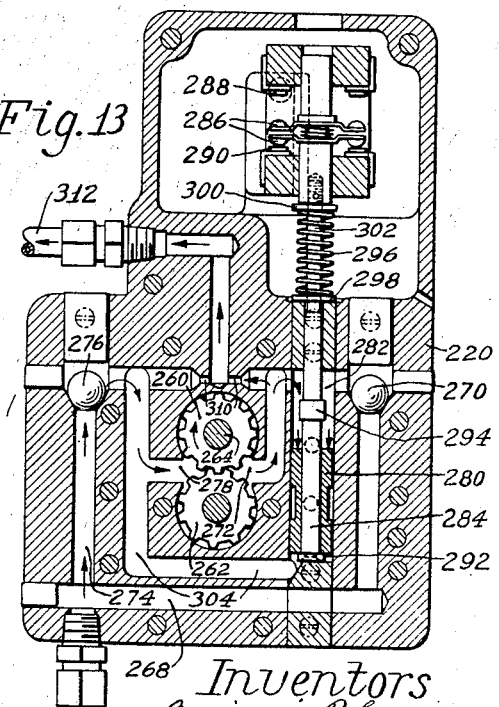
Figure 15:
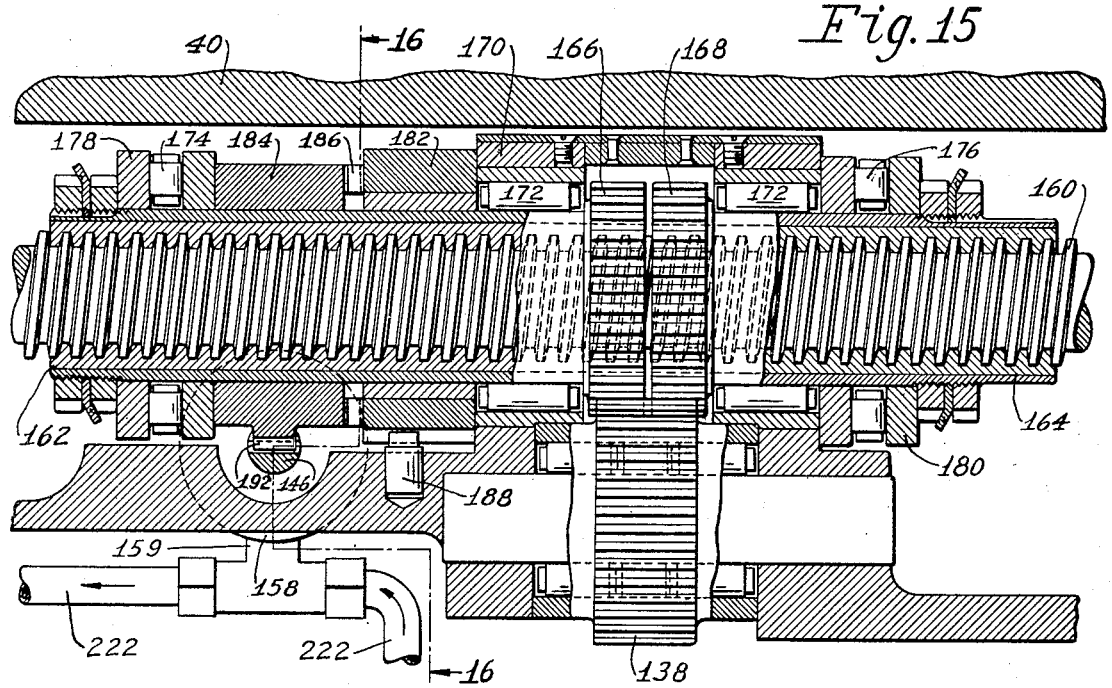
Figure 16:
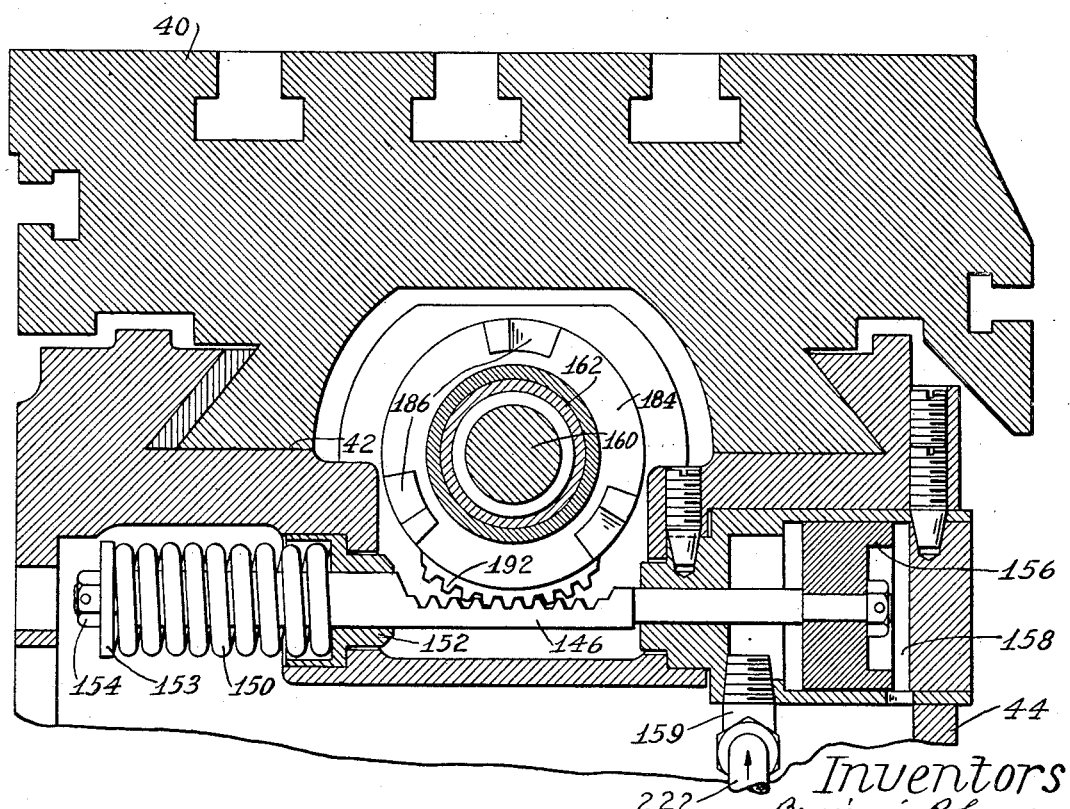
Figure 17:
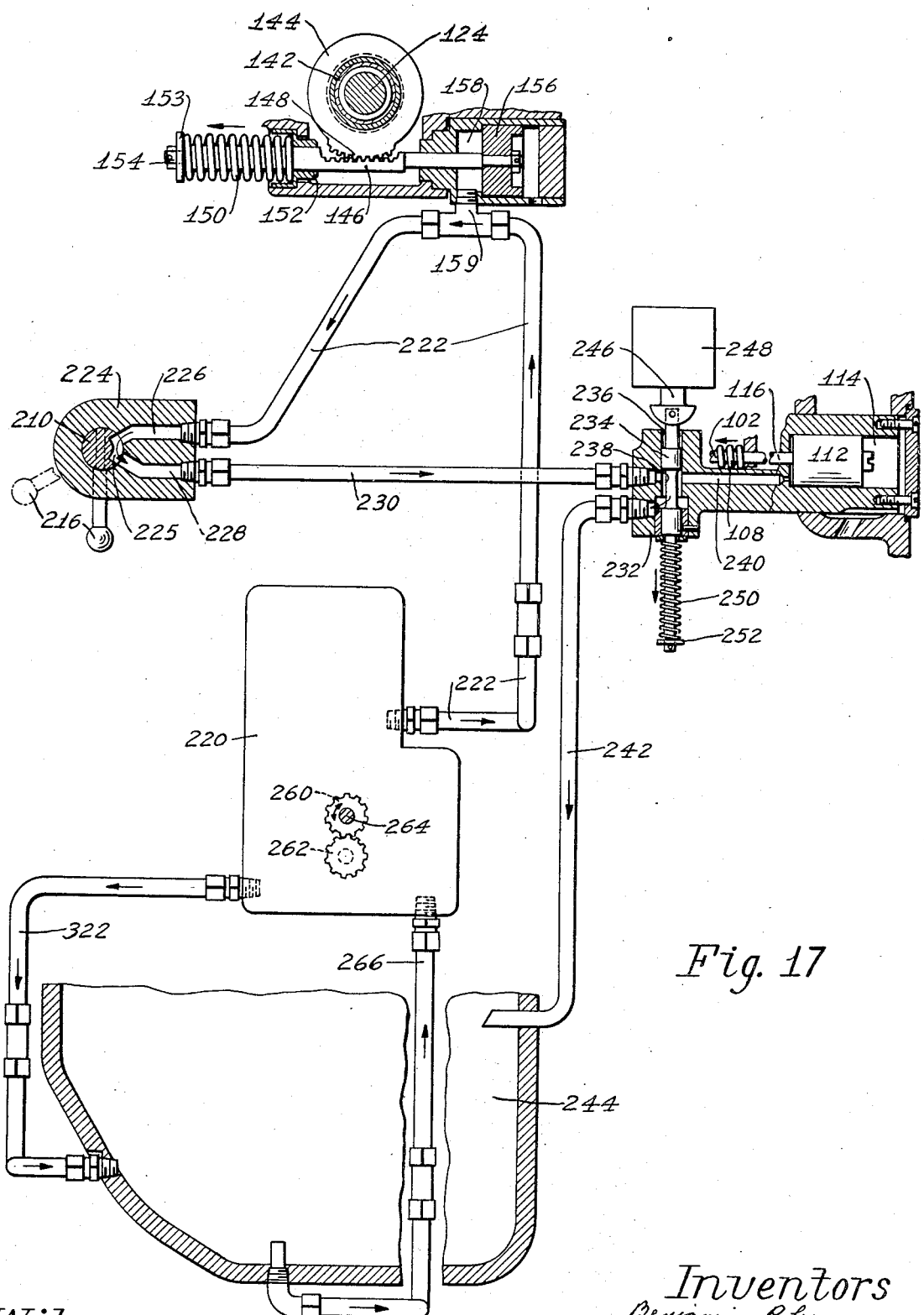
Figure 18:
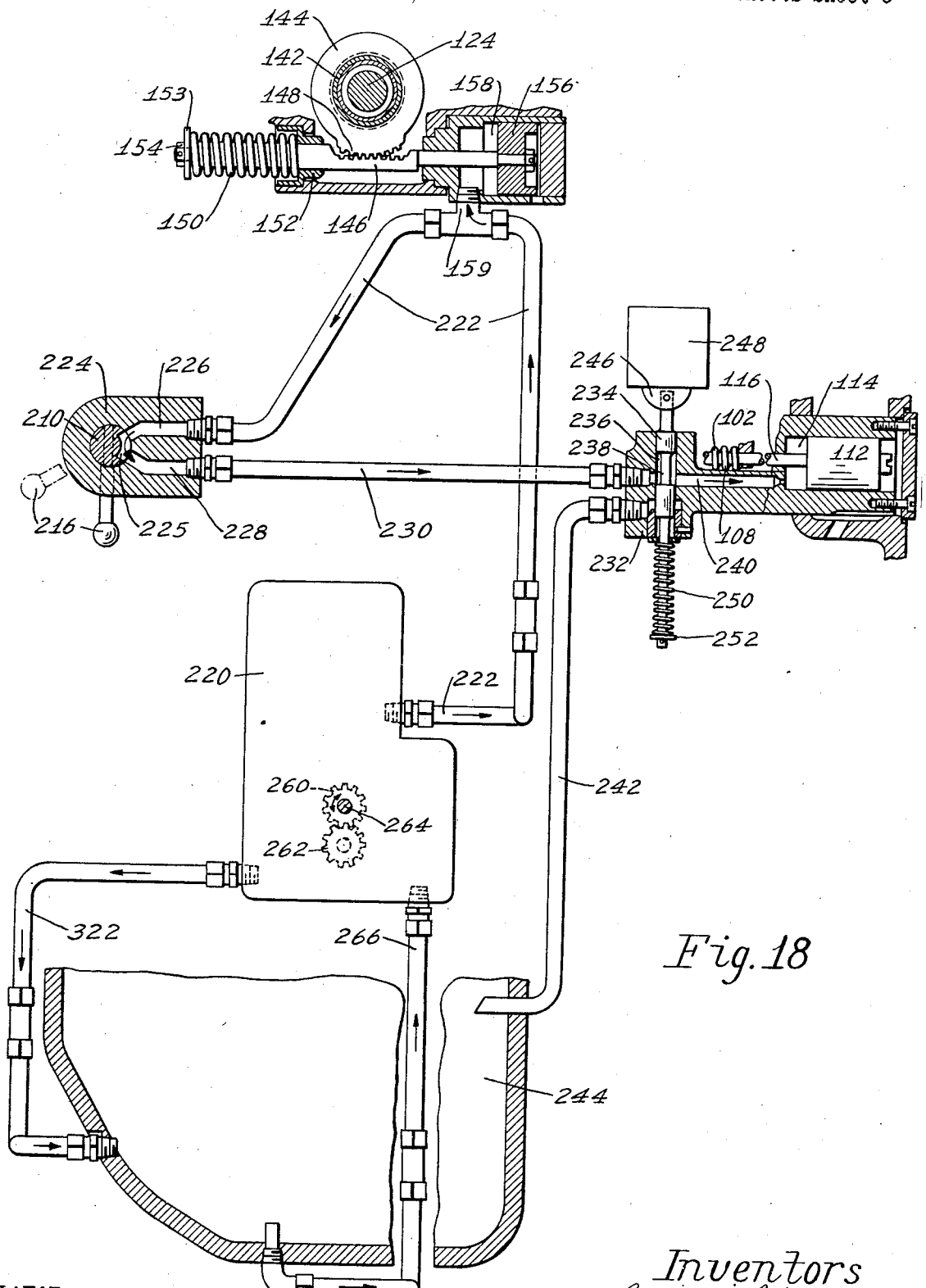
Figure 19:
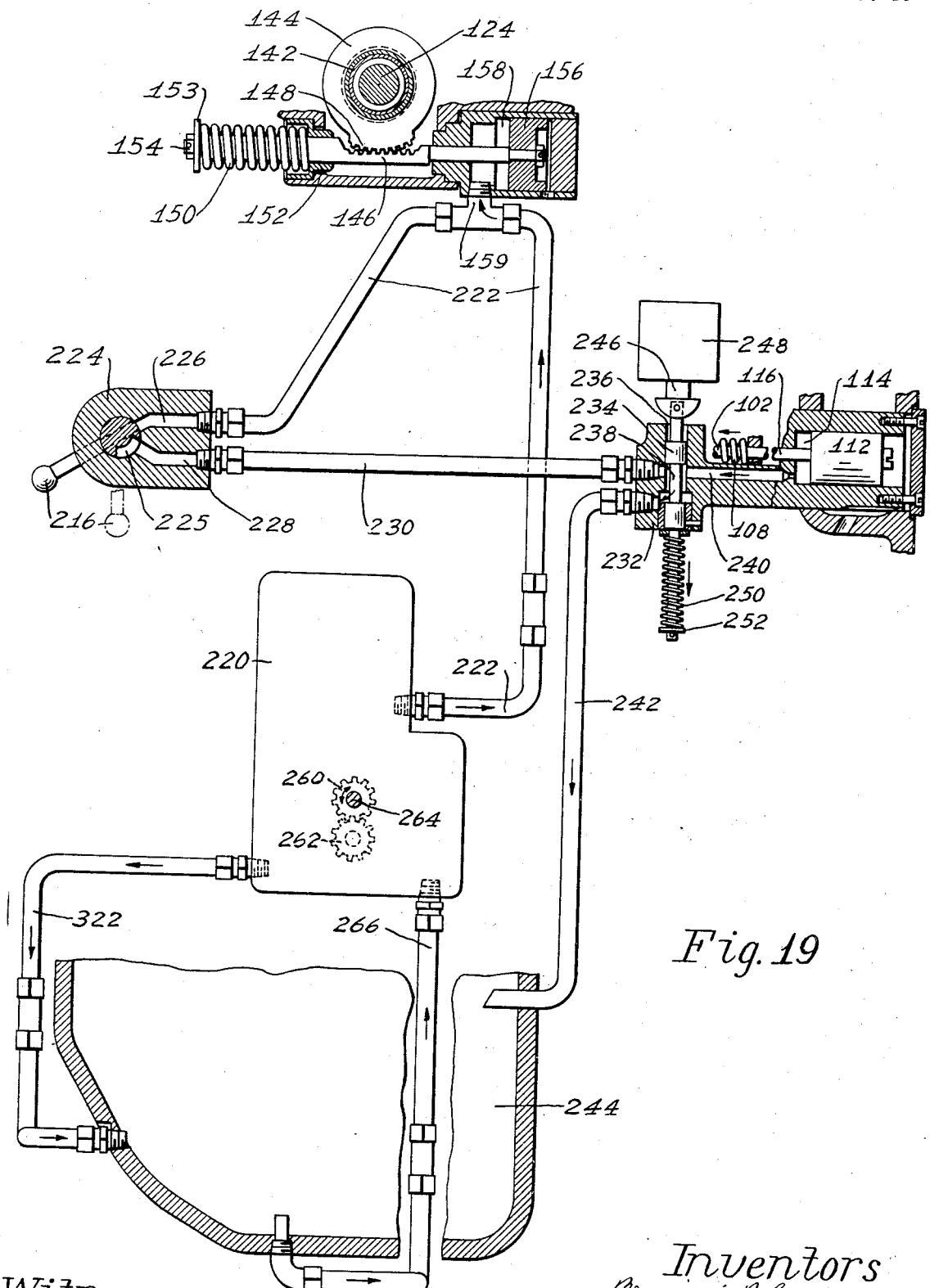

The several features of the invention consist also in the devices, combinations and arrangement of parts hereinafter described and claimed, which together with the advantages to be attained thereby will be readily understood by one skilled in the art from the following description taken in connection with the accompanying drawings, in which Fig. 1 is a view in front elevation of a manufacturing type of milling machine embodying the several features of the invention; Fig. 2 is a detail sectional view in front elevation illustrating particularly the driving connections for the table; Fig. 3 is a detail sectional view on an enlarged scale of a portion of Fig. 2, illustrating particularly the take-up mechanism for the feed screw and nut driving connections; Fig. 4 is a sectional view taken on the line 4—4 of Fig. 3; Fig. 5 is a detail sectional view taken substantially on the line 5—5 of Fig. 2 to illustrate particularly the hand feed connections for driving the table; Fig. 6 is a detail sectional view taken on the line 6—6 of Fig. 5; Fig. 7 is a detail sectional view taken on the line 7—7 of Fig. 5; Fig. 8 is a view similar to Fig. 7 showing the hand feed control member positioned to engage the hand feed; Fig. 9 is a detail sectional view taken on the line 9—9 of Fig. 2 to illustrate particularly a part of the driving connections from the motor to the table; Fig. 10 is a detail sectional view taken on the line 10—10 of Fig. 2 to illustrate particularly the control valve and solenoid for controlling the operation of the slow feed and quick traverse clutch; Fig. 11 is a detail view in front elevation of the reversible lubricating oil pump for the machine; Fig. 12 is a sectional view taken on the line 12—12 of Fig. 11; Fig. 13 is a view similar to Fig. 12 illustrating the operation of the pump in a reverse direction; Fig. 14 is a sectional view taken on the line 14—14 of Fig. 11; Figs. 15 and 16 illustrate a different embodiment of certain features of the invention, and more particularly of the take-up mechanism as applied to a milling machine provided with a stationary feed screw and rotating feed nuts, Fig. 15 being a detail sectional view in front elevation of the feed screw and rotating nut elements and take-up device applied thereto, and Fig. 16 being a sectional view taken on the line 16—16 of Fig. 15; Figs. 17 to 19 inclusive, are somewhat diagrammatic views of the oil pressure control mechanism for controlling the operation of the slow feed and quick traverse clutch and the backlash take-up device for the feed screw and nut elements of the table drive, Fig. 17 showing the parts in position for the power feed operation, Fig. 18 showing the parts in position for quick traverse operation, and Fig. 19 showing the parts in position for hand feed operation; Fig. 20 is a diagrammatic view of the electrical connections for controlling the several cooperating mechanisms of the machine; and Fig. 21 is an explanatory diagrammatic view of the electrical connections illustrated in Fig. 20.

The machine illustrated in the drawings as embodying in a preferred form the several features of the present invention, comprises a manufacturing type milling machine in which the work is supported on a work support or table moveable in a horizontal plane with relation to a vertically adjustable rotary milling cutter. The table is power driven by means of a reversible two-speed electric motor, and intervening driving connections which include a rotatable feed screw mounted on the table, a cooperating stationary nut, a slow traverse gear train, a quick traverse gear train, and a clutch connection movable from a neutral position to engage one or the other of said gear trains to drive the table alternatively at a feeding or quick traverse rate.

Referring more specifically to the drawings, a work supporting table is indicated at 40 mounted to slide on ways 42 formed on the base 44 of the machine. A rotary milling cutter spindle 46 is supported above the table in a casing 48 which is supported for vertical adjustment on the machine column 50. With the machine herein disclosed, the cutter spindle is driven by means of a separate motor 52 through connections generally indicated in dotted lines in Fig. 1.

The work table 40 is driven from a reversible two-speed electric motor 56 through direct connections which include slow feed and quick traverse gear trains and clutch connections for alternatively connecting one or the other of these trains to drive the table. As best shown in Figs. 2, 5 and 9, there is supported on the armature shaft 58 of the motor a gear 60 which meshes with a gear 62 secured to a connecting drive shaft 64. The shaft 64 is connected to drive the main drive shaft 66 of the machine at a slow traverse rate through gear connections comprising intermeshing take-off gears 70 and 72 secured respectively to the shaft 64 and to an idler shaft 74. A second gear 76 on the idler shaft 74 meshes with a gear 78 on a shaft 80 which carries a worm 82 adapted to mesh with a worm gear 84 loosely sleeved to turn on the drive shaft 66. The shaft 66 may be driven at a quick traverse rate from the shaft 64 through gear connections comprising a gear 86 secured to the shaft 64 which is arranged to mesh with a sleeve gear 88 mounted to turn on a short pivot shaft 90. A bevel gear 92 formed integrally with the sleeve gear 88 meshes with a corresponding bevel gear 94 loosely sleeved to turn on the drive shaft 66.

A slow feed and quick traverse clutch member 96 is rigidly secured to the driving shaft 66 between the slow feed worm 84 and the quick traverse bevel gear 94, and is provided at one end with a jaw toothed clutch 98 arranged to engage with a corresponding clutch member formed on the face of the worm gear 84, and at its other end is provided with a jaw toothed clutch face 100 arranged to engage with a corresponding jaw toothed clutch member formed on the adjacent face of the bevel gear 94. Movement of the slow feed and quick traverse clutch 96 to engage alternatively with the slow feed driving worm gear 84 or with the quick traverse bevel gear 94 is effected by an endwise movement of the driving shaft 66 controlled by means of a shifting rod 102 which passes through an axial bore in the drive shaft 66. A nut 104 and a collar 106 are secured to the shaft to engage with opposite ends of the drive shaft 66 to cause the drive shaft 66 to move axially with the shifting rod 102, while permitting the drive shaft to rotate with relation thereto. A heavy compression spring 108 coiled about the shifting rod 102 between a bearing plate 110 secured to the machine frame and the collar 106 on the rod 102 tends normally to hold the shaft 66 and clutch 96 to the left as viewed in Figs. 2 and 5 with the clutch face 98 in engagement with the slow feed worm gear 84. Movement of the drive shaft 66 and the clutch 96 in an opposite direction to engage the quick traverse bevel gear 94 is effected by means of a hydraulically operated piston 112 arranged to slide in a pressure chamber 114 and secured by means of a connecting rod 116 to move axially with the shifting rod 102 and drive shaft 66.

The table 40 is driven from the drive shaft 66 as illustrated in Figs. 2 and 3, through driving connections which comprise a rotatable feed screw 124 supported at each end in bearings in the table, and a stationary feed nut 126 which is rigidly supported against rotational or endwise movement in the machine frame so that rotational movements of the feed screw will cause corresponding endwise movements to be imparted to the feed screw and table 40. For rotating the feed screw 124 there is also keyed thereto a driving nut 128 which is externally supported in the machine frame to permit rotational movement thereof by means of roller bearings 130, and is held against lengthwise movement with relation to the frame by means of end thrust bearings 132 interposed between supporting brackets 133 and adjustable check nuts 134 screw-threaded to each end of the driving nut 128. For rotating the driving nut 128 and feed screw 124 to impart the required feeding movements to the table 40 from the drive shaft 66, an external gear 136 formed on the driving nut 128 is arranged to mesh with the idler gear 138 which, in turn meshes with the driving gear 140 on the drive shaft 66.

In order to secure a tight operating engagement between the feed screw 124 and the stationary nut 126, and thus prevent any possible backlash or chatter in the table drive, there is provided with the present construction an additional nut 142 which is screw-threaded to the feed screw 124 and is keyed against rotation therewith on the machine frame. The nut 142 is moved axially with relation to the feed screw and to the fixed nut 126 by means of a take-up nut 144 provided with internal left and right screw threads which mesh with correspondingly threaded portions of the stationary nut 126 and additional nut 142. The angular position of the take-up nut 144 to tighten or loosen the nut 142 and feed screw with relation to the fixed nut 126 is controlled, as best shown in Figs. 3 and 4, by means of a rack 146 which meshes with a corresponding gear segment 148 formed on the take-up nut 144. A compression spring 150 coiled about the rack rod 146 and seated at one end in a recess formed in the bearing 152 for the rack rod, and at its other end against a collar 153 on the end of the rack rod, tends to move the rack to the left, as shown in Fig. 4, to take up the nuts. The collar 153 is held in position by an adjustable nut 154 to permit an adjustment of the take-up tension exerted by the spring acting through the take-up nut 144. It will readily be seen that the take-up connections described are arranged to permit a relatively heavy take-up tensioning strain to be exerted on the nuts 126 and 142 through the agency of a relatively light spring tension. This arrangement has the further advantage that the action of the take-up nut 144 is irreversible, the threads of the take-up nut being disposed at a less than critical locking angle, so that the heavy strains imparted to the table by the action of the milling cutter on the work are not transmitted to the spring 50, but are entirely taken up against the fixed nut 126 rigidly mounted on the machine frame, so that a positive control of the position of the table is maintained under all conditions during feeding movements of the table in either direction. For rotating the take-up nut 144 in an opposite direction to loosen the operating connection between the nuts and the feed screw 124, a piston 156 is secured to the right-hand end of the rack bar 146, as shown in Fig. 4, and is arranged to slide in an oil pressure cylinder 158, so that the introduction of oil under pressure through the inlet pipe illustrated at 159 in Fig. 4, will move the piston and rack bar to the right against the pressure of the spring 150 to loosen the nuts.

A second embodiment of certain features of the take-up device for maintaining a tight operating engagement between the feed screw and nut elements of the table drive as applied to a stationary feed screw and rotating driving nuts, is illustrated in Figs. 15 and 16 of the drawings. In these figures, a stationary feed screw 160 is employed rigidly secured in the usual manner at opposite ends to the work supporting table 40, and has mounted thereon two feed nuts 162 and 164 which are provided with the external gears 166 and 168 which mesh with the previously described idler gear 138 of the table drive. The feed nuts are externally supported in a bracket 170 formed on the machine frame by means of roller bearings 172, and are supported against lengthwise movement in the machine by means of end thrust bearings 174 and 176 which engage with collars 178 and 180 secured respectively to opposite ends of the two nuts 162 and 164. With this arrangement of the driving connections, it will readily be seen that a constant angular relationship is maintained between the two feed nuts 162 and 164 by the engagement of the external gears 166 and 168 with the idler gear 138.

In order to secure a tight operating engagement between the rotating feed nuts 162 and 164 and the stationary feed screw 160 and thus to prevent any possible backlash or chatter in the table drive, mechanism is provided for imparting a relative axial movement to the nuts to bring these elements tightly into engagement with the threads of the feed screw 160. This mechanism comprises two sleeve members 182 and 184 loosely sleeved on the nut 162 and interposed between a bearing formed by the bracket 170 and the end thrust bearing 174 above described. Corresponding cam surfaces 186 are formed on the adjacent faces of the sleeve members 182 and 184, so that a relative rotational movement of these members will act through the end thrust bearing 174 to move the nut 162 to the left as shown in Fig. 15 to secure a tight operating engagement between the nuts 162 and 164 and the feed screw 160. The sleeve member 182 is held against turning by means of a key 188.

The angular position of the sleeve 184 with relation to the sleeve 182 to tighten or loosen the nuts 162 and 164 with relation to the feed screw 160 is controlled as shown in Figs. 15 and 16, by means of a rack which may be that designated at 146 in the first embodiment described, and meshes with a corresponding gear segment 192 formed on the cam sleeve 184. The compression spring 150 coiled about the rack rod 146 and seated at one end in a recess formed in the bearing 152 for the rack rod, and at its other end against a collar 153 on the end of the rod, tends to move the rack to the left as shown in Fig. 16 to take up the nuts. The compression spring acts against the cam sleeve to impart a lengthwise tensioning strain to the nuts in opposite directions against the fixed end thrust bearings. The angle of the cam surfaces employed is such as to permit the employment of a relatively light strain to secure a relatively heavy tensioning strain on the nuts, and is further arranged to provide an extremely high resistance to any easing off action of the nuts against the combined force of the spring and the frictional resistance of the cam surfaces. With this construction it will be seen that while a yielding spring pressure is utilized to take up the nuts, the arrangement of the cam surfaces 186 provides a substantially irreversible cam action, so that the entire strain upon the connections due to the operation of the cutter against the work, is taken up against the end thrust bearings 174 and 176 and the stationary bracket 170 above described, to maintain a positive control of the position of the table under all conditions during feeding movements of the table in either direction. For rotating the cam sleeve 184 in an opposite direction to loosen the operative connection between the nuts and the feed screw 160, a piston which may be the piston 156 of the first embodiment of the invention described, is secured to the right hand end of the rack bar 146 as shown in Fig. 16, and is arranged to slide in the oil pressure cylinder 158, so that the introduction of oil under pressure through the inlet pipe 159 will move the piston and the rack bar to the right as shown in Fig. 16, against the pressure of the spring 150 to loosen the nuts.

The illustrated machine is provided with hand feed operating connections together with a control mechanism therefor which is arranged normally to maintain the hand feed out of operation, and acts when rendered operative to permit the engagement of the hand feed and simultaneously to move the slow feed and quick traverse clutch to neutral position. The hand feed operating connections as best shown in Figs. 2, 5 and 6, comprises a forwardly extending shaft 200 which is mounted for axial and rotational movements in a bearing 202. At its forward end the shaft is provided with a squared end 204 to receive a manually operable crank handle of ordinary description, and at its rear end carries a gear 206 arranged to mesh with a corresponding crown gear 208 on the drive shaft 66. It will be seen from an inspection of Fig. 5, that the shaft 200 may be moved rearwardly to bring the gear 206 into operative engagement with the crown gear 208 only for a lengthwise position of the drive shaft 66 which corresponds to a neutral or intermediate position of the slow speed and quick traverse clutch 96. The mechanism for controlling the operation of the hand feed comprises a plug 210 journalled in a casing 212 axially in alignment with the drive shaft 66. At its inner end the plug is provided with a bearing surface arranged to engage with the end of the shifting rod 102, and with an offset cam 214 arranged to engage with the face of the gear 206 on the inner end of the hand feed shaft 200. For controlling the operation of the plug 210 to impart lengthwise and rotational movements thereto, a hand lever 216 is secured to the side of the plug 210 and extends outwardly through a cam slot 218 in the casing 212. With the plug in its normal inoperative position, the plug is withdrawn out of engagement with the shifting rod 102, and the cam 214 is positioned to lock the hand feed shaft 200 and gear 206 in a retracted position out of engagement with the crown gear 208. When it is desired to throw the hand feed into operation, the control lever 216 is moved downwardly to the position shown in Fig. 6 to rotate the plug, and at the same time cause it to be advanced through the engagement of the control lever 216 with the cam slot 218 above described. This movement of the plug acts to move the cam 214 to permit a forward movement of the hand feed shaft 200, and simultaneously moves the shifting rod 102, drive shaft 66 and clutch 96 to the right, as shown in Fig. 5, against the pressure of the spring 108 to throw the clutch 96 into neutral, and to position the crown gear 208 for engagement with the gear 206 on the hand feed shaft 200.

In accordance with a principal feature of the present invention, a control system is provided for controlling the operation of the take-up device hereinbefore described, to render said device operative to provide a tight operating engagement between the screw and nut elements during the power slow feed of the machine in either direction, and acting simultaneously with the movement of the clutch 96 to quick traverse position to ease off said device to permit a free working engagement of the feed screw and nut elements. There is also provided in the present construction, means rendered operative by the movement of the hand feed control member 216 into position for engaging the hand feed, to ease off the take-up device and permit a free operating engagement between the feed screw and nut elements during the manual operation of the table. As illustrated in Figs. 17, 18 and 19, an oil pressure control system is provided for controlling the operation of the slow speed and quick traverse clutch 96, and also for controlling the operation of the take-up device. Oil pressure is supplied from a reversible pump 220, directly connected to the armature shaft 58 of the table driving motor 56, through a conduit 222 to the inlet 159 to the oil pressure cylinder 158 for controlling the operation of the rack bar 146 of the take-up device. Fluid under pressure is carried from this point through an extension of the conduit 222 to a valve 224 which is controlled by the hand feed control lever 216, and comprises a channel 225 formed in the plug 210, and inlet and outlet ports 226 and 228 formed in the valve casing. The outlet port 228 is connected by a conduit 230 to a valve 232 which controls the operation of the slow feed and quick traverse clutch 96. The valve 232 comprises a piston 234 arranged for movement in a cylindrical chamber 236, and having formed thereon a cylindrical port 238. In addition to the inlet provided by the conduit 230, there is an outlet 240 to the oil pressure chamber 114 for controlling the operation of the slow speed and quick traverse clutch 96, and an outlet 242 to the sump 244. At its upper end the piston 234 is connected to the armature 246 of a solenoid 248, and at its lower end is provided with an extension on which is coiled a compression spring 250 which engages at one end with a collar 252 on the extension, and at its other end with the valve casing 232.

The operation of the control system for slow feed power operation of the machine, is illustrated in Fig. 17. As shown in this figure, the hand feed control lever 216 is in its inoperative position to permit a free flow of oil under pressure through the valve 224. The solenoid 248 is deenergized so that the piston 234 of the valve 232 occupies a depressed position under the influence of its spring 250 to allow a passage for the oil through the outlet 242 to the sump. Under these conditions no pressure is applied to the pressure cylinder 158 for the take-up device, so that the rack 146 is permitted to move under the pressure of its spring 150 to secure a tight operating engagement between the feed screw and nut elements. Similarly, pressure is exhausted from the cylinder 114 for controlling the operation of the slow feed and quick traverse clutch 96, so that the clutch is permitted to move to a slow feed position in engagement with the feed worm gear 84 under the pressure of the spring 108.

For a quick traverse operation of the machine, the solenoid 248 is energized to raise the piston 234, shutting off the exhaust conduit 242 to the sump. Under these conditions, as illustrated in Fig. 18 of the drawings, the oil pressure is built up in the pressure cylinder 158 to move the rack bar 146 to the right against the pressure of its spring 150 to relieve the tension of the nuts 128 and 142, so that a free operating engagement is provided between the feed screw and nut elements. At the same time pressure is permitted to build up in the pressure cylinder 114 to move the piston 112 to the right against the pressure of the spring 108 to disengage the slow feed and quick traverse clutch 96 from the slow feed driving worm gear 84, and to engage the clutch with the quick traverse bevel gear 84 to drive the machine at a quick traverse rate.

The operation of the control system for the hand operation of the machine is illustrated in Fig. 19. At this time the solenoid 248 is de-energized, allowing the piston 234 to move to its depressed position, opening the exhaust conduit 242 to the sump to exhaust the pressure from the pressure cylinder 114. The control lever 216 is now moved to its depressed position, as shown in Fig. 19, to permit the engagement of the hand feed, simultaneously causing the valve 224 to be closed by the rotation of the plug 210. Pressure is consequently built up in the cylinder 158 to move the rack bar 146 to the right against the pressure of its spring 150 to relieve the tension on the nuts 126 and 142, so that a free operating engagement is provided between the feed screw and nut elements to permit an easy and unobstructed operation of the hand feed lever by the operator.

The reversible oil pump 220 in addition to supplying oil under pressure to the fluid pressure control system above described, is also arranged to supply oil for the lubrication of various bearings in the machine, and is further arranged to control the operation of a switch in the electrical operating connections for the machine including the solenoid 248 to delay the shifting of the slow feed and quick traverse clutch to quick traverse position when this takes place upon reversal of the direction of drive until after reversal has actually taken place. The pump 220, as illustrated in Figs. 11 to 14 inclusive, is provided with two meshing gears 260 and 262 for pumping oil through the connecting passages of the pump in either direction, the gear 260 being mounted on a drive shaft 264 directly connected to the armature shaft 58 of the main driving motor. The pump is provided with an intake line 266 through which oil is drawn through a branch line 268, and ball check valve 270 to a chamber 272 adjacent the two gears during a left hand operation of the table, as illustrated in Fig. 12, or alternatively is drawn through a branch line 274 and check valve 276 to a chamber 278 adjacent the two gears for a right hand operation of the table drive, as illustrated in Fig. 13.

The pump is also provided with a sliding valve piston 280 which is fitted within a valve chamber 282 and is journalled to receive a plunger or shaft 284, which carries at its upper end the switch contact arms 286 adapted to close an electric circuit alternatively through switch contacts 288 for a left hand drive of the table, or through the switch contacts 290 for a right hand drive of the table. The piston 280 is mounted for a limited sliding movement with relation to the plunger 284 between two collars 292 and 294 on the plunger.

A compression spring 296 coiled about the plunger 284 between two collars 298 and 300 loosely sleeved on a reduced portion 302 of the plunger tends at all times to return the plunger and switch arms 286 to an intermediate neutral position.

Assuming that the table is being driven to the left with the gears 260 and 262 rotating in the direction of the arrow in Fig. 12, oil is drawn through the branch line 268, ball check valve 270 and chamber 272, and is delivered under pressure into the chamber 278 from whence it passes through a conduit 304 to the lower portion of the valve chamber 282, forcing the valve piston 280 and plunger 284 upwardly to the position shown in Fig. 12, closing a circuit through the contacts 288. This movement of the valve piston uncovers a port 306 through which oil now passes under pressure to the inlet line 222 of the fluid pressure control system above described.

When the main feed motor is reversed to drive the table to the right, the pump gears will be driven in a reverse direction as shown by the arrow in Fig. 13. Oil is now drawn through the branch line 274, ball check valve 276 and chamber 278, and is delivered under pressure into the chamber 272 and the upper portion of the valve chamber 282, causing the valve piston 280 and plunger 284 to be depressed to the position shown in Fig. 13 to close the circuit through the switch contacts 290. This movement of the valve piston uncovers a port 308 through which oil now passes under pressure to the conduit 222 of the fluid pressure control system above described.

As the main driving motor and the gear pump connected thereto come to rest upon the stopping or reversal of the table, the spring 296 operates to centralize the plunger 284 and switch arms 286, thus opening the corresponding plugging switch contacts 288 or 290. The sliding piston 280 is also moved to an intermediate position closing both of the ports 306 and 308 communicating with the conduit 222 to prevent any appreciable loss of pressure in the fluid pressure control system at this time.

For the lubrication of the various parts of the machine, each of the chambers 272 and 278 is connected by means of a small orifice 310 to a lubricating conduit 312. The size of the orifices 310 is calculated to permit only a limited flow of oil through the conduit 312 which will be sufficient for the proper lubrication of the machine without at the same time short circuiting the pump. These orifices also serve to permit the exhaustion of oil from the chambers 272 and 278, so that the valve piston 280 can be returned to its neutral or intermediate position under the pressure of the spring 296 without danger of becoming stalled upon the stopping or reversal of the main driving motor and pump.

In order to maintain the pressure in the fluid pressure control system at a predetermined value, a relief valve 314 is provided in the line 222 comprising a valve head and a stem 316 about which is coiled a compression spring 318 seated within a cylindrical member 320 which is screwthreaded for adjustment in the pump casing. Any excess oil which escapes through the relief valve 314 is carried through an exhaust line 322 back to the sump.

In accordance with certain features of the present invention, electrical connections are provided for controlling the operation of the two speed reversible driving motor and of the fluid pressure control system above described to secure a simple and efficient control of these devices for the power operation of the machine by the operator or automatically by means of dogs mounted on the work supporting table. The electrical connections referred to are similar in many respects to those set forth in the application of the present applicant filed of even date herewith, but may be briefly described as follows in connection with Fig. 1, the electrical wiring diagram Fig. 20, and the explanatory diagram Fig. 21 of the drawings.

The rate and direction of the power operation of the table is controlled by means of a simple arrangement of switch control buttons which comprise left and right feed buttons and left and right quick traverse buttons. With the arrangement of the electric connections hereinafter to be described in connection with the electrical diagram, Fig. 20, the rate of travel of the table may be varied to effect either slow feed or quick traverse movement of the table at any point in the table travel in either direction, or the direction of travel of the table may be reversed at either a slow feed or quick traverse rate by pressing the designated button for establishing the required rate and direction of travel of the table. The switch contact buttons for controlling the direction and rate of feed of the support are mounted, as indicated in Fig. 1, in a control post 324 which is located adjacent one side of the table. These buttons are arranged in two series and comprise four buttons 326 mounted in vertical alignment on the table side of the control post to cooperate with corresponding dogs on the table to control the direction and rate of feed of the table, and a second series of manually controlled buttons 328 mounted on the opposite side of the control post to permit the convenient operation of the controls by hand. As more fully pointed out in the copending application of the present applicants above referred to, the control post is mounted to turn about a fixed pivot to enable the automatic control buttons 326 to be moved out of the path of the dogs when it is desired to manually control the power operation of the table. Two additional stop buttons 330 are mounted on a fixed portion of the machine frame for engagement with corresponding dogs on the table to positively limit the movement of the table in either direction. In order to permit an automatic control of the motor speed during the continued operation of the table so that the feeding rate may be automatically adjusted to varying conditions in the making of the cut without the necessity of stopping the machine or of shifting clutch connections under load, a mercury switch 332 is provided as indicated in Figures 1 and 20 of the drawings which may be controlled by means of adjustable table dogs 334 which are mounted for adjustment on the rear side of the table. These dogs are arranged to engage with two corresponding vertically movable racks 336 and 338 arranged to mesh with opposite sides of a pinion 340 on a rock shaft 342 to which the mercury switch is secured.

Referring specifically to the electrical wiring diagram Fig. 20 and the explanatory diagram Fig. 21, it will be seen that the table driving motor 56 and the spindle driving motor 52 are driven from a three phase power line designated as L¹, L² and L³. The table motor is controlled by means of a reversing switch having two exciting relays L and R.

The main switch for the table motor is supported on a panel indicated in dotted lines at 350 in Fig. 20, and comprises two sets of contacts which are controlled by the relay coils R and L respectively to connect the motor and table for right or left hand operation. A high speed and low speed switch for the table motor 56 is also mounted on the panel 350, and comprises two sets of contacts controlled respectively by the relay coils HS and LS for high speed or low speed operation of the table motor.

On another panel indicated at 352 in dotted lines, are carried the main switch contacts for the spindle motor 52 controlled by means of two relay coils SF and SR for opposite directions of rotation of the motor and spindle driven thereby.

There are also provided on a panel 354 designated in dotted lines in Fig. 26, a number of secondary relay switches, which are arranged to control the operation of the table and spindle switches above described together with the solenoid 248 and valve piston 234 which operate the slow feed and quick traverse clutch 96. These secondary relays comprise the secondary coils LR and RR controlled respectively by the left and right feed buttons, the coils TL and TR controlled respectively by the left and right quick traverse buttons, a relay coil RC which controls the operation of the slow feed and quick traverse solenoid 248 and valve piston 234, and also has connections which are arranged under certain operating conditions to control the operation of the high speed table motor and the spindle motor switches.

Two additional secondary relay coils CRR and CRL, also supported on the panel 254, are provided in the circuit controlled by the plugging switch contacts 288 and 290, and operate in connection therewith to apply a braking torque for plugging the motor to rest upon stopping or reversing the drive of the table, and also to delay the operation of the solenoid 112 to shift the clutch to quick traverse position upon reversal at a quick traverse rate.

Inasmuch as the several switch relays and the contacting switches controlled thereby may be of any well known construction, these parts have been shown conventionally only for simplicity and convenience in illustration.

Assuming a rest position of the machine and that it is desired to start the machine feeding to the left, pressing the "Feed left" button energizes the LR coil. LR contacts 4—3 now close to form a holding circuit, LR contacts 2—19 close, energizing the main contact coil L to start the table motor, and LR contacts 2—21 also close to energize either the SF or SR coil to start the spindle motor. The pressing of the "Feed right" button with the machine at rest will operate similarly to start the table feeding to the right. At this point it may be noted that when the table moves to the left, the plugging switch contactors 288 are closed by the operation of the oil pump 220 as above described, so that the plugging switch contactor coil CRL is energized, opening the plugging switch contacts 2—17 and closing the contacts 2—18. When the direction of table travel is reversed to the right, the plugging switch contacts 288 are opened, and after the reversal of the electric motor has actually taken place, the plugging switch contacts 290 close to energize the CRR coil, causing the plugging switch contacts 2—16 to open and the contacts 2—15 to close.

The connections herein disclosed are particularly adapted for operation upon shifting from a slow feed in one direction to a quick traverse movement of the table in the opposite direction, to delay the shifting of the clutch to quick traverse position until after reversal has actually taken place. If it be assumed that the table is feeding to the left, the pressing of the "Fast right" button will operate to reverse the movement of the table at a quick traverse rate as follows:—The contactors LR, L, LS and SF may be assumed to be closed as well as the plugging switch relay contacts 2—16 and 2—18. The pressing of the "Fast right" button energizes the coil TR. TR contacts 10—11 close, energizing the coil RR. TR contacts 17—20 and 20—21 close, but the RC coil is not at this time energized to open the control valve 232 and shift the clutch, because of the fact that the contacts 2—17 are still open. RR contacts 2—4 open, de-energizing LR coil which opens the main contactor L. RR contacts 14—16 also close, forming a holding circuit through LR contacts 2—14 which also close. RR contacts 2—22 energize the main contactor coil R, electrically reversing the motor. As the motor and the reversible pump connected thereto stop and start to turn in an opposite direction, the switch arms 286 controlled by the pump are first moved to a neutral position to disengage the contacts 288 and de-energize the CRL coil, and are then moved to close the contacts 290 to energize the CRR coil. The CRL contacts 2—17 are now closed, energizing the RC coil. The RC contacts 2—31 now close to energize the solenoid 248, opening the main control valve 232 to shift the clutch to quick traverse position. At the same time RC contacts 25—6 open to disconnect the spindle circuit, and also to disconnect the low speed coil LS. RC contact 2—23 also closes to energize the high speed contactor HS regardless of the position of the mercury switch above described. The shift from a slow speed of the table to the right to a quick traverse left may be similarly accomplished by pressing the "Fast left" button.

For other ways in which the electrical devices may be operated to control the operation of the machine, reference may be had to the copending application of the present applicants above referred to.

The nature and scope of the invention having been indicated, and a machine embodying the several features of the invention having been specifically described, what is claimed is:

1. A mechanism to eliminate backlash between the screw and nut elements of a driving connection for moving one support with relation to another which comprises a screw on one of said supports, a pair of nuts threaded to the screw, means for maintaining a constant angular relationship between the nuts, and a take-up device having a take-up action to maintain a tight operating engagement between said screw and nut elements comprising tensioning means, take-up means actuated thereby comprising cam actuating surfaces for imparting relative movements to the nuts cammed at a less than critical locking angle to impart an unyielding relative axial movement to the nuts, and means cooperating with said take-up device for rigidly positioning said nuts on the other of said supports against movement relatively thereto with the screw in either direction.

2. A mechanism to eliminate backlash between the screw and nut elements of a driving connection for moving one support with relation to another which comprises a screw on one of said supports, a pair of nuts threaded to the screw, means for maintaining a constant angular relationship between the nuts, and a take-up device having a take-up action to maintain a tight operating engagement between said screw and nut elements comprising a spring, a member yieldingly actuated by the spring and having cam actuating surfaces cammed at a less than critical locking angle to impart a relative axial movement to the nuts, and means cooperating with said take-up device for rigidly positioning said nuts on the other of said supports against movement relatively thereto with the screw in either direction.

3. A mechanism to eliminate backlash between the screw and nut elements of a driving connection for moving one support with relation to another which comprises a screw on one of said supports, a pair of nuts threaded to the screw, means for maintaining a constant angular relationship between the nuts, and a take-up device having a take-up action to maintain a tight operating engagement between said screw and nut elements comprising a rotatable take-up member supported co-axially with the screw, a spring for rotating said member, cam surfaces rendered operative by the rotation of said member and arranged at a less than critical locking angle to exert an unyielding relative take-up strain on the nuts, and means cooperating with said take-up member for rigidly positioning said nuts on the other of said supports against movement relatively thereto with the screw in either direction.

4. A mechanism to eliminate backlash between the screw and nut elements of a driving connection for moving one support with relation to another which comprises a screw on one of said supports, a pair of nuts threaded to the screw, means for maintaining a constant angular relationship between the nuts, and a take-up device having a take-up action to maintain a tight operating engagement between said screw and nut elements comprising a take-up nut having a left and right screw-threaded engagement respectively with said nuts, said screw threads being arranged to have an irreversible take-up action, spring means for tensioning the take-up nut, and means cooperating with the take-up nut for rigidly positioning the nuts on the other of said supports against movement relatively thereto with the screw in either direction.

5. A mechanism to eliminate backlash between the screw and nut elements of a driving connection for moving one support with relation to another which comprises a screw on one of said supports, a pair of nuts threaded to the screw, means for maintaining a constant angular relationship between the nuts, and a take-up device having a take-up action to maintain a tight operating engagement between said screw and nut elements comprising a take-up nut having a left and right screw-threaded engagement respectively with said nuts, spring means for tensioning the take-up nut, and means cooperating with the take-up nut for rigidly positioning the nuts on the other of said supports against movement relatively thereto with the screw in either direction.

6. A mechanism to eliminate backlash between the screw and nut elements of a driving connection for moving one support with relation to another, which comprises a screw on one of said supports, a pair of nuts threaded to the screw, means for maintaining a constant angular relationship between the nuts, positioning means for the nuts on the other of said supports, and a take-up device having a take-up action to maintain a tight operating engagement between said screw and nut elements comprising a rotatable take-up member supported co-axially with the screw, a spring for rotating said member, and cam surfaces rendered operative by the rotation of said member to exert a relative take-up strain on the nuts, said cam surfaces being disposed to cooperate with said positioning means at a locking angle to provide a rigid support against forces acting on the driven support through said driving connection axially of the screw in either direction.

7. A mechanism to eliminate backlash between relatively movable screw and nut elements of a driving connection for a machine tool support which comprises a feed screw, a pair of nuts threaded to said feed screw, means for relatively rotating said feed screw and nuts including means to maintain a constant angular relationship between said nuts, a take-up device having a take-up action to provide a tight operating engagement between said feed screw and nut elements comprising an end thrust bearing for each of said nuts to limit axial movement of each of said nuts in an opposite direction, a take-up member, cam surfaces rendered operative by the movement of said member and cammed at a less than critical locking angle to exert an unyielding axial take-up strain on one of said nuts with relation to its bearing, and tensioning means for exerting a take-up tension on said member.

8. A mechanism to eliminate backlash between relatively movable screw and nut elements of a driving connection for a machine tool support which comprises a feed screw, a pair of nuts threaded to said feed screw and means for relatively rotating said feed screw and nuts including means to maintain a constant angular relationship between said nuts, and a take-up mechanism having a take-up action to maintain a tight operating engagement between said feed screw and nut elements comprising an end thrust bearing engaging each of said nuts to limit axial movement of each of said nuts in opposite directions, a take-up member, co-operating cam surfaces arranged upon movement of said member to move one of said nuts axially with relation to its end thrust bearing to provide a tight operating engagement between said feed screw and nut elements, said cam surfaces being cammed at a less than critical locking angle to provide a locking engagement against axial movement of said nuts to actuate said member, and tensioning means for exerting a take-up tension on said member 9. A mechanism to eliminate backlash between relatively movable screw and nut elements of a driving connection for a machine tool support which comprises a non-rotatable feed screw mounted to move with said support, a pair of nuts threaded to said feed screw, and means for rotating said nuts including means to maintain a constant angular relationship between said nuts, a take-up device having a take-up action to provide a tight operating engagement between said feed screw and nut elements comprising an end thrust bearing for each of said nuts to limit axial movement of each of said nuts in an opposite direction, a take-up member, cam surfaces rendered operative by the movement of said member and cammed at a less than critical locking angle to exert an unyielding axial take-up strain on one of said nuts with relation to its bearing, and tensioning means for exerting a take-up tension on said member.

10. A mechanism to eliminate backlash between relatively movable screw and nut elements of a driving connection for a machine tool support which comprises a rotatable feed screw, a relatively stationary nut threaded thereto, a second nut threaded to the feed screw keyed against rotation with relation to said former nut, and a take-up device for controlling the relative axial positions of the nuts to maintain a tight working engagement between the nuts and the feed screw comprising a take-up nut having a left and right screw thread engagement respectively with said nuts, said screw threads being arranged to have an irreversible take-up action, and means for rotating said take-up nut to impart a relative axial movement to said nuts for securing a tight operating engagement between the feed screw and nut elements.

11. A mechanism to eliminate backlash between relatively movable screw and nut elements of a driving connection for a machine tool support which comprises a rotatable feed screw, a relatively stationary nut threaded thereto, a second nut threaded to the feed screw keyed against rotation with relation to said former nut, a take-up device for controlling the relative axial positions of the nuts to maintain a tight working engagement between the nuts and the feed screw comprising a take-up nut having a left and right screw-threaded engagement respectively with said nuts, said screw threads being arranged to have an irreversible take-up action, and spring means tending yieldingly to rotate said take-up nut to impart a relative axial movement to said nuts for securing a tight operative engagement between the feed screw and nut elements.

12. A mechanism to eliminate backlash between the screw and nut elements of a driving connection for moving one support with relation to another which comprises a screw on one of said supports, a pair of nuts threaded to the screw, means for maintaining a constant angular relationship between the nuts, and a take-up device having a take-up action to maintain a tight operating engagement between said screw and nut elements comprising tensioning means, take-up means actuated thereby and comprising cam actuating surfaces for imparting relative movements to the nuts cammed at a less than critical locking angle to impart an unyielding relative axial movement to the nuts, and means cooperating with said take-up device for rigidly positioning said nuts on the other of said supports against movement relatively thereto with the screw in either direction, and independent means for moving said take-up means against the pressure of said tensioning means to ease off the take-up device.

13. A mechanism to eliminate backlash between the screw and nut elements of a driving connection for moving one support with relation to another which comprises a screw on one of said supports, a pair of nuts threaded to the screw, means for maintaining a constant angular relationship between the nuts, a take-up device having a take-up action to maintain a tight operating engagement between said screw and nut elements comprising a rotatable take-up member supported co-axially with the screw, a spring for rotating said member, cam surfaces rendered operative by the rotation of said member and cammed at a less than critical locking angle to exert an unyielding relative take-up strain on the nuts, and means cooperating with said take-up member for rigidly positioning said nuts on the other of said supports against movement relatively thereto with the screw in either direction, and independent means for moving the take-up member against the pressure of its spring to ease off the take-up device.

14. A mechanism to eliminate backlash between the screw and nut elements of a driving connection for moving one support with relation to another which comprises a screw on one of said supports, a pair of nuts threaded to the screw, means for maintaining a constant angular relationship between the nuts, a take-up device having a take-up action to maintain a tight operating engagement between said screw and nut elements comprising a take-up nut having a left and right screw-threaded engagement respectively with said nuts, spring means for tensioning the take-up nut, means cooperating with the take-up nut for rigidly positioning the nuts on the other of said supports against movement relatively thereto with the screw in either direction, and independent means for moving the take-up nut against the pressure of its spring to ease off the take-up device.

15. A mechanism to eliminate backlash between relatively movable screw and nut elements of a driving connection for a machine tool support which comprises a feed screw, a pair of nuts threaded thereto, means for maintaining a constant angular relationship between said nuts, a take-up device having a take-up action to maintain a tight operating engagement between said feed screw and nut elements comprising a rotatable take-up member, cam surfaces rendered operative by the movement of said member and cammed at a less than critical locking angle to exert an unyielding relative axial take-up strain on said nuts, means cooperating with said take-up member to provide a rigid support for said nuts, a rack and pinion for rotating said take-up member, spring means engaging said rack to rotate said member to exert a take-up tensioning strain on said nuts, and a fluid pressure operated piston connected to move with said rack arranged when rendered operative to move the rack against the pressure of its spring to ease off said take-up device.

16. A mechanism to eliminate backlash between relatively movable screw and nut elements of a driving connection for a machine tool support which comprises a feed screw, a pair of nuts threaded thereto, means for maintaining a constant angular relationship between said nuts, a take-up device having a take-up action to maintain a tight operating engagement between said feed screw and nut elements comprising a take-up member, cam surfaces rendered operative by the movement of said member and cammed at a less than critical locking angle to exert an unyielding relative axial take-up strain on said nuts, tensioning means for exerting a take-up tension on said member, means cooperating with said take-up member to provide a rigid support for said nuts against movement with the screw in either direction, and a fluid pressure control system for controlling the operation of the support including a fluid operated piston connected to said take-up member and rendered operative upon the actuation of said control system to establish certain operating conditions to ease off said take-up device and permit a free operating engagement between said feed screw and nut elements.

17. A mechanism to eliminate backlash between relatively movable screw and nut elements of a driving connection for a machine tool support which comprises a feed screw, a pair of nuts threaded thereto, means for supporting said feed screw against movement axially with relation to one of said base and said work support, means for supporting the assembly of said nuts against movement axially with relation to the other of said work support and base, means for maintaining a constant angular relationship between said nuts, a take-up device for controlling the relative axial positions of the nuts to maintain a tight working engagement between the nuts and the screw comprising a take-up member, cam surfaces rendered operative by the movement of said member and cammed at a less than critical locking angle to exert an unyielding relative axial take-up strain on said nuts to secure a tight fitting and axially non-yielding assembly of said nuts and their supporting means with relation to said feed screw, tensioning means for exerting a take-up tension on said member, and means for moving said take-up member against the said tensioning means to ease off said take-up device to permit a free operating engagement between said feed screw and nut elements.

18. A mechanism to eliminate backlash between relatively movable screw and nut elements of a driving connection for a machine tool support which comprises a slow feed train, a quick traverse train, a slow feed and quick traverse clutch, spring means tending to maintain the clutch in its slow feed position, a take-up device having a take-up action to maintain a tight operating engagement between said feed screw and nut elements comprising a take-up member, means for imparting a take-up tensioning strain to said member, fluid pressure operated control devices comprising a piston operated by fluid pressure for moving said take-up member against said tensioning strain to ease off the take-up device, a piston operated by fluid pressure to move said clutch against the pressure of its spring to quick traverse position, means for supplying fluid pressure to said pistons, an exhaust connection from each of said pistons, and a control valve having alternative positions simultaneously to shut off or to open the exhaust connections from each of said pistons.

19. A mechanism to eliminate backlash between the screw and nut elements of a driving connection for moving one support with relation to another which comprises a screw on one of said supports, a pair of nuts threaded to the screw, means for maintaining a constant angular relation between the nuts, a take-up device comprising a take-up nut having left and right screw-threaded engagement respectively with said nuts, said screw threads being arranged to have an irreversible take-up action, spring means for tensioning the nut, means cooperating with the take-up nut for rigidly positioning the nuts on the other of said supports against movement relatively thereto with the screw in either direction, and fluid pressure operated control devices comprising a piston operated by fluid pressure to ease off said take-up member against the pressure of the spring.

20. A mechanism to eliminate backlash between relatively movable screw and nut elements of a driving connection for a machine tool support which comprises a power drive including slow feed and quick traverse clutch connections for relatively rotating said feed screw and nut elements to drive the support, spring means for maintaining the clutch in feed position, a take-up device having a take-up action to maintain a tight operating engagement between said feed screw and nut elements comprising a take-up member and spring means for imparting a take-up tensioning strain to said member, and fluid pressure operated control devices comprising a piston operated by fluid pressure to ease off said take-up member against said tensioning means, a piston actuated by fluid pressure for moving said clutch connections to quick traverse position, a source from which fluid pressure is supplied to said pistons, and control valve mechanism arranged alternatively to supply fluid pressure or to exhaust the pressure from both of said pistons.

21. A mechanism to eliminate backlash between relatively movable screw and nut elements of a driving connection for a machine tool support which comprises a power drive for imparting relative rotational movements to said feed screw and nut elements to drive the support including clutch connections movable to drive the support alternatively at a slow feed or a quick traverse rate, connections for manually operating the support including a normally inoperative clutch connection, a hand feed control member acting when rendered operative to disengage the power feed and to permit the engagement of said manually operable clutch connections, a take-up device for said feed screw and nut elements comprising a take-up member and spring means for imparting a take-up tensioning strain to said member, and fluid pressure operated devices for controlling the operation of said take-up mechanism to permit a free operating engagement between said feed screw and nut elements comprising a piston operated by fluid pressure to ease off said take-up device, means for supplying fluid under pressure to said piston, an outlet for exhausting said fluid pressure from said piston, a valve rendered operative by the operation of said hand feed control member to close said exhaust outlet, and valve connections rendered operative upon movement of said clutch connections to quick traverse position to close said exhaust outlet.

22. A mechanism to eliminate backlash between relatively movable screw and nut elements of a driving connection for a machine tool support which comprises a power drive for relatively rotating said feed screw and nut elements to drive the support, a take-up device having a take-up action to maintain a tight operating engagement between said feed screw and nut elements comprising a take-up member, and means for imparting a take-up tensioning strain to said member, clutch connections in said power drive, connections for manually operating said support, a manual feed control member arranged normally to lock said manual feed connections out of operation adapted when actuated to disengage said clutch connections and permit the engagement of the manual feed connections, and fluid pressure operated devices for controlling the operation of said take-up mechanism comprising a piston operated by fluid pressure to ease off said take-up member against said tensioning means, means for supplying fluid under pressure to said piston, an exhaust connection for said piston, a valve in said exhaust connection, and means rendered operative by the actuation of said hand feed control member to close the valve.

23. A mechanism to eliminate backlash between the screw and nut elements of a driving connection for a machine tool support which comprises driving connections including cooperating feed screw and nut elements for driving the support, slow feed and quick traverse clutch connections for driving the support alternatively at a slow feed or quick traverse rate, spring means tending to maintain said clutch connections in slow feed position, a take-up device for said feed screw and nut elements comprising a take-up member, spring means for imparting a take-up tensioning strain to said member, connections for manually operating the support comprising a manual feed control member arranged to disengage the power feed, and devices operated by fluid pressure for controlling said mechanisms comprising a piston operated by fluid pressure to ease off said take-up member, a piston operated by fluid pressure for moving the clutch to quick traverse position, means for supplying fluid pressure to each of said pistons, exhaust connections from each of said pistons, a valve for simultaneously closing said exhaust outlets to shift the clutch and to ease off the take-up device, a second valve in the exhaust connection from the piston associated with the take-up device, and connections from the manual feed control member for closing said latter valve.

24. Mechanism for eliminating backlash between the screw and nut elements of a driving connection for a machine tool support which comprises a power drive for imparting relative rotational movements to the feed screw and nut elements including a reversible electric motor, clutch mechanism adjustable to drive the support alternatively at a slow feed or quick traverse rate, spring means tending to maintain the clutch in feed position, a take-up device for said feed screw and nut elements comprising a take-up member and cam surfaces having an irreversible take-up action, means for imparting a take-up tensioning strain to said member, fluid pressure operated devices including a piston operated by fluid pressure to ease off said take-up device, a piston operated by fluid pressure to shift the clutch to quick traverse position, means for supplying fluid under pressure to said pistons, a valve, and connections controlled thereby simultaneously to supply or to exhaust pressure from said pistons, and electrical control devices including an electromagnet for actuating said valve.

25. In a machine tool, the combination of a tool, a movable work support, driving means for the support including a driving member rotatable in opposite directions to drive the support in reverse directions, a reversible fluid pressure pump directly connected to be driven in reverse directions with the driving member, a slow feed and quick traverse clutch, controlling means for determining the position of the clutch, a control device operable to reverse the direction of drive and simultaneously to shift said clutch control means to quick traverse position, and a plugging device actuated by reversal in the direction of flow of fluid pressure from the pump to render said clutch control means operative to shift the clutch to quick traverse position.

26. In a machine tool, the combination of a tool, a movable work support, driving means for the support including a slow feed and quick traverse clutch, a reversible electric motor, a reversible fluid pressure pump directly connected to be driven in opposite directions with the motor, a reversing switch for the motor, an electric circuit acting when closed to move said clutch to quick traverse position, a plugging device actuated by reversal in the direction of flow of said fluid pressure to close a contact in said circuit, and means controlled by the movement of the table to reverse said reversing switch and simultaneously to close a second contact in said circuit to move the clutch to quick traverse position upon the closing of said pressure controlled contact.

27. In a machine tool, the combination of a tool, a movable work support, driving means for the support including a slow feed and quick traverse clutch, means tending to hold said clutch normally in slow feed position, a reversible electric motor, a reversible liquid pressure pump directly connected to be driven in opposite directions with the motor, a reversing switch for the motor, fluid pressure control mechanism including a valve acting when rendered operative to move said clutch to quick traverse position, an electric circuit including an electromagnet acting when energized to move said valve to quick traverse position, a plugging device actuated by reversal in the direction of flow of said liquid pressure to close a contact in said circuit, and means controlled by the movement of the support to reverse said reversing switch and simultaneously to close a second contact in said circuit to cause said electromagnet to be energized by the closing of said pressure operated contact to move said clutch from slow feed to quick traverse position.

28. In a machine tool, the combination of a tool, a movable work support, driving means for the support including a driving member rotatable in opposite directions to drive the support in reverse directions, a slow feed and quick traverse clutch, controlling means for determining the position of the clutch, means controlled by movement of the table to reverse the direction of drive and simultaneously to shift said clutch control means to quick traverse position, and means actuated by the reversal in the direction of rotation of said rotatable driving member to render said clutch control means operative to shift the clutch to quick traverse position.

29. In a machine tool, the combination of a tool, a movable work support, driving means for the support including a driving member rotatable in opposite directions to drive the support in reverse directions, cooperating feed screw and nut elements for actuating the support, a slow feed and quick traverse clutch, a take-up device having a take-up action to maintain a tight operating engagement between said feed screw and nut elements, control devices actuated by the movement of the table in one direction to reverse the direction of drive, and means controlled by said devices and rendered operative only upon reversal of rotation of said driving member to shift said clutch to quick traverse position and simultaneously to ease off said take-up device to provide a free operating engagement between said feed screw and nut elements.

30. In a machine tool, the combination of a tool, a movable work support, cooperating feed screw and nut elements for driving said support, driving connections for imparting relative rotational movements to said feed screw and nut elements comprising slow feed and quick traverse clutch connections, a reversible electric motor, a reversible fluid pressure pump connected to said reversible motor including a reversible pumping unit, an outlet from said pump, two ports for alternatively admitting fluid under pressure to said outlet for alternative directions of drive of said pumping unit, a valve member moved by the direction of operation of said pumping unit for closing the inactive port, electrical connections comprising an electromagnet acting when energized to move said clutch to quick traverse position, two electric circuits alternatively operative to energize said electromagnet, switch connections controlled by the movement of said valve member to close a contact alternatively in one or the other of said circuits only for a corresponding direction of drive of the support, and a second contact for each of said circuits controlled by the movement of the table for completing the corresponding circuit to energize the electromagnet.

31. In a machine tool, the combination of a tool, a movable work support, cooperating feed screw and nut elements for driving said support, driving connections for imparting relative rotational movements to said feed screw and nut elements, comprising a slow feed and quick traverse clutch connection, a reversible electric motor, a reversible fluid pressure pump connected to said reversible motor including a reversible pumping unit, two chambers arranged alternatively to serve respectively as inlet and outlet chambers for said pumping unit, an outlet for said pump, ports for admitting fluid under pressure alternatively from one or the other of said chambers to said outlet for alternative directions of drive of said pumping unit, a valve having connection with each of said chambers and controlled by the direction of operation of said pumping unit to open the port from the outlet chamber to said outlet for the pump, electrical connections comprising a reversing switch for the motor, an electromagnet acting when energized to move said clutch to quick traverse position, a circuit including switch connections controlled by the operation of the table for energizing said magnet, and a plugging switch controlled by the operation of said valve to delay the closing of said circuit to shift the clutch to quick traverse position until after reversal has actually taken place.

32. In a machine tool, the combination of a tool, a movable work support, cooperating feed screw and nut elements for driving said support, driving connections for imparting relative rotational movements to said feed screw and nut elements, comprising a slow feed and quick traverse clutch connection, a reversible electric motor, a reversible fluid pressure pump connected to said reversible motor including a reversible pumping unit, two chambers arranged alternatively to serve respectively as inlet and outlet chambers for said pumping unit, an inlet check valve for each of said chambers, an outlet for said pump, ports for admitting fluid under pressure alternatively from one or the other of said chambers to said outlet for alternative directions of drive of said pumping unit, a valve including a sliding valve piston, and a valve chamber having connection with each of said chambers and controlled by the direction of operation of said pumping unit to open the port from the outlet chamber to said outlet for the pump, spring means tending to move said piston to an intermediate position to close both of said ports, a small outlet from each of said chambers to permit escape of a limited amount of fluid under pressure, electrical connections comprising an electromagnet acting when energized to move said clutch to quick traverse position, two electric circuits alternatively operative to energize said electromagnet, switch connections controlled by the movement of said valve member and having neutral and alternative operative positions to close the contact alternatively in one or the other of said circuits only for a corresponding direction of drive of the support, and a second contact for each of said circuits controlled by the movement of the table for completing the corresponding circuit to energize the electromagnet.

33. In a machine tool, having cooperating feed screw and nut elements for driving a support, driving connections for imparting relative rotational movements to said feed screw and nut elements comprising a slow feed and quick traverse clutch connection, a reversible two-speed electric motor, a slow speed and high speed switch for the motor, a fluid pressure control system including a source from which fluid under pressure is supplied, a piston operated by fluid pressure for controlling the operation of the clutch connections, a valve to control the application of fluid under pressure to said piston, electrical connections including an electromagnet to control the operation of said valve to shift the clutch to quick traverse position, and a control device acting when rendered operative to energize said electromagnet to shift the clutch to quick traverse position and simultaneously to shift said switch to high speed position.

34. In a machine tool, having cooperating feed screw and nut elements for actuating a support, a power drive for imparting relative rotational movements to the feed screw and nut elements including a reversible electric motor, clutch mechanism adjustable to drive the support alternatively at a slow feed or quick traverse rate, a take-up device having a take-up action to maintain a tight operating engagement between said feed screw and nut elements comprising a take-up member, means for imparting a take-up tensioning strain to said member, a fluid pressure control system comprising a reversible fluid pressure pump driven from said motor, a piston operated by fluid pressure to ease off said take-up member, a piston operated by fluid pressure to control the operation of said clutch, a valve for controlling the flow of fluid pressure to said pistons to simultaneously shift said clutch to quick traverse position and to ease off said take-up device, and electrically operated control devices comprising a reversing switch for the motor, an electromagnet acting when energized to control the operation of said valve, a circuit closing contact for said electromagnet, means acting when rendered operative to actuate said reversing switch and simultaneously to close said contact, and a plugging switch controlled by said reversible pump to energize said electromagnet only after reversal has taken place.

BENJAMIN P. GRAVES.
ARTHUR F. BENNETT.